(12) United States Patent
Rosenzweig et al.

(10) Patent No.: US 6,649,722 B2
(45) Date of Patent: Nov. 18, 2003

(54) CONTACT LENS

(75) Inventors: Howard S. Rosenzweig, Skokie, IL (US); Michael H. Quinn, Valparaiso, IN (US); Robert Tucker, Arlington Heights, IL (US); Greg Carlson, Chicago, IL (US); Gerardo J. Ocampo, Bridgeview, IL (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/731,331

(22) Filed: Dec. 6, 2000

(65) Prior Publication Data

US 2002/0107337 A1 Aug. 8, 2002

Related U.S. Application Data

(60) Provisional application No. 60/170,162, filed on Dec. 10, 1999.

(51) Int. Cl.[7] ............... G02C 7/04; B29D 11/08; C08F 30/08
(52) U.S. Cl. ............ 526/279; 526/245; 526/311; 526/328; 526/328.5; 526/329.2; 526/329.5; 526/329.7; 525/100; 525/101; 525/106; 525/474; 525/479; 525/937; 523/106; 523/107
(58) Field of Search ............... 525/93, 94, 100, 525/101, 106, 242, 298, 301, 302, 308, 418, 419, 421, 426, 428, 431, 451, 474, 479, 535, 540, 957; 526/245, 279, 288, 303.1, 307.4, 307.7, 317.1, 318, 318.4, 319, 328, 328.5, 329.2, 329.5, 329.7, 346; 523/106, 107

(56) References Cited

U.S. PATENT DOCUMENTS

| 3,228,741 A | 1/1966 | Becker et al. |
| 3,341,490 A | 9/1967 | Burdick et al. |

(List continued on next page.)

FOREIGN PATENT DOCUMENTS

| WO | WO 99/57177 | 11/1999 |
| WO | WO 00/29130 | 5/2000 |

OTHER PUBLICATIONS

Brennan, et al., *Opt. Vis. Sci.*, 74(8):609–623 (1997).
*Tyler's Quarterly Soft Contact Lens Parameter Guide* (Sep. 2000).

*Primary Examiner*—Robert Dawson
*Assistant Examiner*—Jeffrey B. Robertson
(74) *Attorney, Agent, or Firm*—Jian S. Zhou; Richard I. Gearhart; R. Scott Meece

(57) ABSTRACT

This invention is directed to ophthalmic materials and ophthalmic lenses that are a co-polymerization product of a (a) hydrophilic monomer with (b) a tris(siloxy)silyl group-containing monomer, (c) a wide variety of hydrophobic monomers (both aliphatic and aromatic) and usually a (d) polyfluorinated monomer, as well as optional monomers or monomer mixtures that can include a cationic monomer, a non-aromatic hydrophobic monomer and a poly (dimethylsiloxy)silyl group-containing monomer. A contact lens prepared from such a co-polymer exhibits enhanced water content, while maintaining exceptional oxygen permeability, thereby providing a lens that can be worn comfortably for prolonged periods of time. A process for the preparation of such lenses is also disclosed.

105 Claims, 4 Drawing Sheets

U.S. PATENT DOCUMENTS

| | | | |
|---|---|---|---|
| 3,808,178 | A | 4/1974 | Gaylord et al. |
| 3,996,187 | A | 12/1976 | Travnicek |
| 3,996,189 | A | 12/1976 | Travnicek |
| 4,028,295 | A | 6/1977 | Loshaek |
| 4,109,070 | A | 8/1978 | Loshaek et al. |
| 4,111,535 | A | 9/1978 | Loshaek et al. |
| 4,136,250 | A | 1/1979 | Mueller et al. |
| 4,158,089 | A | 6/1979 | Loshaek et al. |
| RE30,368 | E | 8/1980 | Loshaek et al. |
| 4,228,269 | A | 10/1980 | Loshaek et al. |
| 4,312,725 | A | 1/1982 | Loshaek et al. |
| 4,686,267 | A * | 8/1987 | Ellis et al. .............. 351/160 H |
| 4,711,943 | A | 12/1987 | Harvey, III |
| 4,954,586 | A * | 9/1990 | Toyoshima et al. ......... 523/107 |
| 4,954,587 | A * | 9/1990 | Mueller ..................... 526/245 |
| RE33,477 | E | 12/1990 | Loshaek |
| 5,070,169 | A | 12/1991 | Robertson et al. |
| 5,177,168 | A * | 1/1993 | Baron et al. ................ 526/245 |
| 5,314,960 | A * | 5/1994 | Spinelli et al. .............. 525/280 |
| 5,314,961 | A * | 5/1994 | Anton et al. ............... 525/280 |
| 5,346,946 | A * | 9/1994 | Yokoyama et al. ......... 524/547 |
| 5,539,016 | A | 7/1996 | Kunzler et al. |
| 5,610,252 | A | 3/1997 | Bambury et al. |
| 5,741,830 | A * | 4/1998 | Kamiya et al. ......... 351/160 H |
| 5,760,100 | A | 6/1998 | Nicolson et al. |
| 5,855,825 | A * | 1/1999 | Ito .............................. 264/2.6 |
| 5,948,401 | A | 9/1999 | Donabedian et al. |
| 6,255,362 | B1 * | 7/2001 | Ito ............................ 264/1.32 |
| 6,265,499 | B1 * | 7/2001 | Nagino et al. .............. 526/206 |
| 6,346,594 | B1 * | 2/2002 | Watanabe et al. ....... 351/160 H |

* cited by examiner

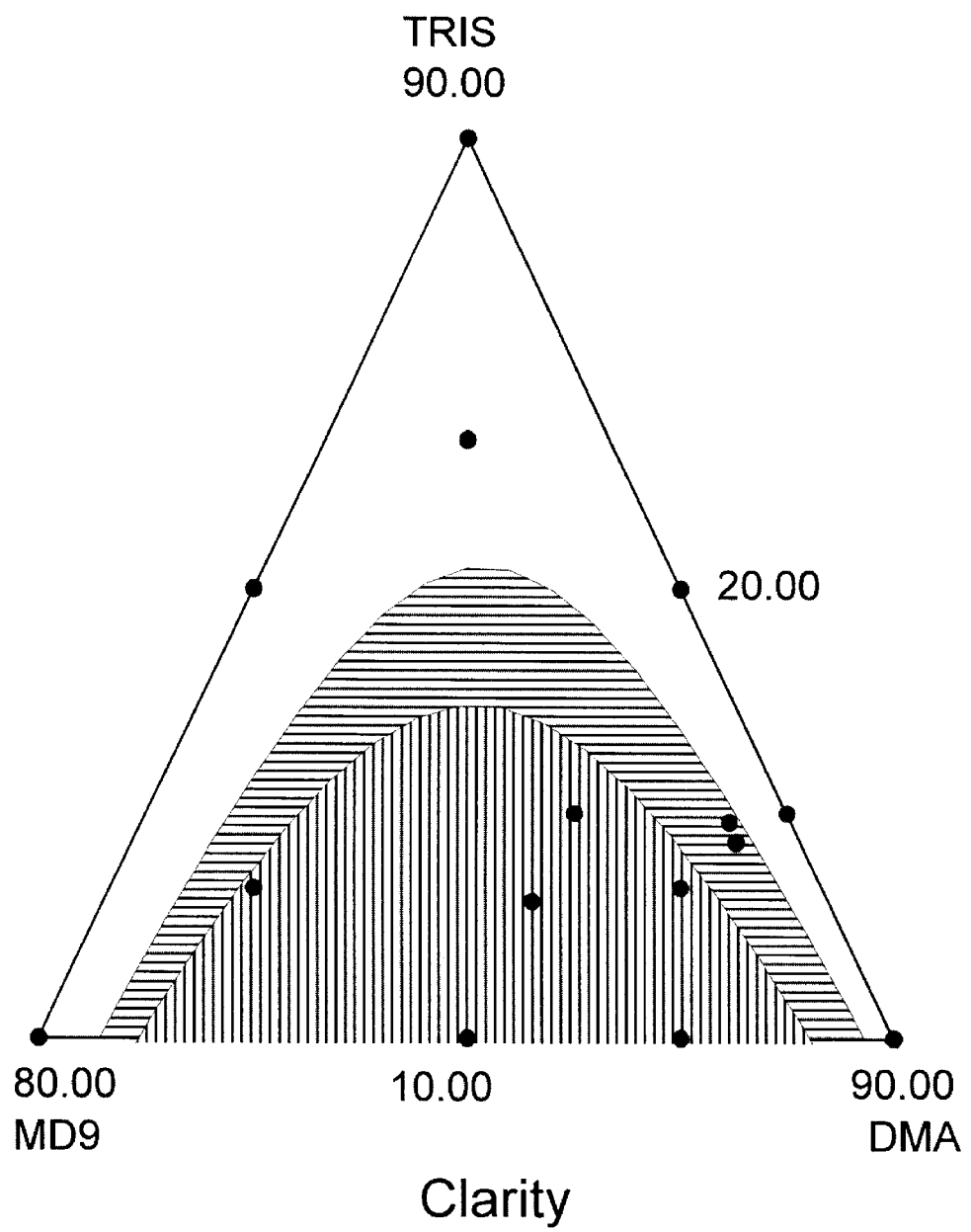

CONTACT LENS

CROSS-REFERENCE TO RELATED APPLICATION

This application claims benefit under 35U.S.C. §119(e) of provisional application No. 60/170,162, filed on Dec. 10, 1999, whose disclosures are incorporated herein by reference.

TECHNICAL FIELD

This invention relates broadly to lenses and polymeric materials useful in optic and ophthalmic arts. More specifically, this invention relates to polymeric materials, contact lenses and treatment processes useful in the manufacture of contact lenses.

BACKGROUND ART

A wide variety of research has been conducted in the field of biocompatible polymers. The definition of the term "biocompatible" depends on the particular application for which the polymer is designed. In the field of ophthalmic lenses, and in particular in the field of contact lenses, a biocompatible lens is generally defined as one that does not substantially damage the surrounding ocular tissue and ocular fluid during the time period of contact. The phrase "ophthalmically compatible" more appropriately describes the biocompatibility requirements of ophthalmic lenses.

One ophthalmic compatibility feature for contact lenses is that the lens permits oxygen to reach the cornea in an amount that is sufficient for long-term corneal health. The contact lens should permit oxygen from the surrounding air to reach the cornea because the cornea does not receive oxygen from the blood supply like other tissues. If sufficient oxygen does not reach the cornea, corneal swelling can occur, as can epithelial microcysts, stromal/epithelial thinning, stromal acidosis, endothelial polymegethism, corneal ulcers and increased inflammation. Brennan et al., *Opt. Vis. Sci.*, 74(8):609–623 (1997). "Soft" contact lenses conform closely to the shape of the eye, so oxygen cannot easily circumvent the lens. Thus, soft contact lenses should permit oxygen to diffuse through the lens to reach the cornea.

Another ophthalmic compatibility feature for soft contact lenses is that the lens not adhere strongly to the eye. Clearly, the consumer should be able to easily remove the lens from the eye for disinfecting, cleaning or disposal. Moreover, the lens should also be able to move on the eye in order to encourage tear flow between the lens and the eye. Tear flow between the lens and eye permits debris, such as foreign particulates or dead epithelial cells, to be swept from beneath the lens and, ultimately, out of the eye in tear fluid. Thus, a contact lens should not adhere to the eye so strongly that adequate movement of the lens on the eye is inhibited.

Although there exist rigid gas permeable ("RGP") contact lenses that have high oxygen permeability and that move on the eye, RGP lenses are typically quite uncomfortable for the consumer. Many consumers therefore prefer soft contact lenses. Moreover, a contact lens that can be continuously worn for a period of a day or more (including wear during periods of sleeping) implies comfort levels that exclude RGP lenses as popular extended-wear candidates.

In order to balance the ophthalmic compatibility and consumer comfort requirements in designing a daily wear soft contact lens, polymers and copolymers of 2-hydroxyethyl methacrylate (HEMA), N-vinyl pyrrolidone and glyceryl methacrylate (GMA) were developed. These hydrophilic polymers move well on the eye and provide sufficient oxygen permeability for daily wear (e.g. about 8–35 Dk units). The FDA has approved certain soft contact lenses for extended wear periods of up to about six nights of overnight wear and seven days of daily wear. However, the consumer cannot safely and comfortably wear these poly (HEMA) lenses for extended periods of seven days or more, because the oxygen permeability is insufficient. True extended wear (i.e., seven days or more) of these lenses can result, at a minimum, in corneal swelling and development of surface blood vessels in the cornea. In order to improve oxygen permeability, polymers containing silicone groups were developed. Many siloxane-containing polymers have been disclosed as having high oxygen permeability. [For example, see U.S. Pat. Nos. 3,228,741; 3,341,490; 3,996, 187; and 3,996,189.] However, contact lenses made using those known polysiloxanes often adhere to the eye, inhibiting the necessary lens movement. Polysiloxanes are typically highly lipophilic, which causes a haze of lipids and proteins to form that interferes with vision through the lens.

There have been attempts to blend the desirable properties of hydrophilic polymers, formed from monomers such as HEMA, with the desirable oxygen permeability of polymers formed from siloxane-containing monomers. [For example, see U.S. Pat. Nos. 3,808,178; 4,136,250; 4,711,943; 5,070, 169 and 5,760,100.] However, prior attempts at producing a true extended-wear contact lens have not been particularly successful, either because of the effect of the extended-wear lens on corneal health or because the lens would not move on the eye. Thus, oxygen permeabilities remained too low and/or the lenses adhered to the corneas.

Thus, there remains a need for an ophthalmically compatible, transparent polymeric material that is suited to prolonged periods of continuous contact with ocular tissue and tear fluid. The discussion that follows discloses such materials, contact lenses made from those materials and processes for preparing the lenses.

BRIEF SUMMARY OF THE INVENTION

It has been discovered that the co-polymerization of a (a) hydrophilic monomer with (b) a wide variety of hydrophobic monomers (both aliphatic and aromatic), (c) a tris (siloxy)silyl group-containing monomer, and usually a (d) polyfluorinated monomer and optional monomers or monomer mixtures that can include a cationic monomer, a non-aromatic hydrophobic monomer and a poly(dimethylsiloxy) silyl group-containing monomer, provides a polymer that has substantially greater water content, while maintaining exceptional oxygen permeability.

Thus, the present invention contemplates an ophthalmic lens comprising a polymeric material that has an oxygen permeability of about 45 to about 150 Dk units and a hydrated water content of about 20 to about 55 weight percent. The polymeric material is comprised of a co-polymer of (a) a hydrophilic monomer, (b) a hydrophobic (aromatic, aliphatic or mixture) monomer, (c) a tris(siloxy) silyl group-containing monomer, (d) a fluorinated monomer containing about 3 to about 20 fluorine atoms per monomer molecule (a polyfluorinated monomer) and (e) an amount of cross-linker sufficient to provide a stress at break value of about 0.003 to about 30N/mm$^2$, elongation at break of about 25 to about 3000 percent and a modulus value of about 0.001 to about 10 N/mm$^2$.

Another polymeric contact lens material comprises a co-polymer of polymerized (a) non-ionic hydrophilic monomer, (b) hydrophobic (aromatic, aliphatic or mixture)

monomer, (c) tris(siloxy)silyl group-containing monomer, (d) fluorinated monomer containing about 3 to about 20 fluorine atoms per monomer molecule (polyfluorinated monomer) and (e) cross-linking agent. The weight ratio of the tris(siloxy)silyl group-containing monomer to the non-ionic hydrophilic monomer is about 0.3:1 to about 2:1. The lens material exhibits an oxygen permeability of greater than about 60 Dk units and a water content at equilibrium hydration of about 20 to about 55, and preferably about 35 to about 55 weight percent.

A further embodiment contemplates a polymeric contact lens comprising a co-polymerized (a) non-ionic hydrophilic monomer containing a methacrylamide, an acrylamide, a methacrylate or an acrylate group, (b) a hydrophobic (aromatic, aliphatic or mixture) monomer, (c) a tris(siloxy) silyl group-containing monomer, (d) a fluorinated monomer containing about 3 to about 20 fluorine atoms per monomer molecule (polyfluorinated monomer) and (e) cross-linking agent. The weight ratio of the tris(siloxy)silyl group-containing monomer to the non-ionic hydrophilic monomer is about 0.3:1 to about 2:1. This lens exhibits an oxygen transmissibility of about 60 to about 150 Dk units and a water content at equilibrium hydration of about 20 to about 55, and preferably about 35 to about 55 weight percent.

Yet another polymeric contact lens comprises co-polymerized (a) non-ionic hydrophilic monomer containing a methacrylamide, an acrylamide, a methacrylate ester or an acrylate ester group, (b) fluorinated monomer containing about 3 to about 20 fluorine atoms per monomer molecule (polyfluorinated monomer), (c) tris(siloxy)silyl group-containing monomer, (d) styrene-containing monomer and (e) cross-linking agent. Here, the weight ratio of the tris (siloxy)silyl group-containing monomer to the non-ionic hydrophilic monomer is about 0.3:1 to about 2:1. The lens exhibits an oxygen transmissibility of about 45 to about 150 Dk units and a water content at equilibrium hydration of about 20 to about 55, and preferably about 35 to about 55 weight percent.

A still further polymeric contact lens comprises co-polymerized (a) non-ionic hydrophilic monomer containing a methacrylamide, an acrylamide, a methacrylate ester or an acrylate ester group, (b) fluorinated monomer containing about 3 to about 20 fluorine atoms per monomer molecule (polyfluorinated monomer), (c) tris(siloxy)silyl group-containing monomer, (d) a $C_1$–$C_{10}$ hydrophobic methacrylate or acrylate monomer and (e) cross-linking agent. Here, the weight ratio of the tris(siloxy)silyl group-containing monomer to the non-ionic hydrophilic monomer is about 0.3:1 to about 2:1. The lens exhibits an oxygen transmissibility of about 50 to about 150 Dk units and a water content at equilibrium hydration of about 20 to about 55, and preferably about 35 to about 55 weight percent.

A further contact lens is the co-polymerization product of a monomer mixture comprising (a) a non-ionic hydrophilic monomer, (b) a tris(siloxy)silyl group-containing monomer, (c) a hydrophobic aromatic monomer such as a styrene-containing monomer, (d) a polyfluorinated monomer, a cationic monomer, a hydrophobic non-aromatic monomer or a mixture of two or three of those monomer types and (e) a cross-linking agent. The monomer mixture includes a weight ratio of tris(siloxy)silyl group-containing monomer to hydrophilic monomer of about 0.3:1 to about 2:1, and a weight ratio of tris(siloxy)silyl group-containing monomer to a single monomer or monomer mixture of (d) of about 1.5:1 to about 20:1. This lens also exhibits an oxygen transmissibility of about 45 to about 150 Dk units and a water content at equilibrium hydration of about 35 to about 55 weight percent.

A still further contact lens is the co-polymerization product of a monomer mixture comprising (a) a non-ionic hydrophilic monomer, (b) a cationic monomer, (c) a tris (siloxy)silyl group-containing monomer, (d) a hydrophobic aromatic monomer such as a styrene-containing monomer, and (e) a cross-linking agent. The monomer mixture includes a weight ratio of tris(siloxy)silyl group-containing monomer to hydrophilic monomer of about 0.3:1 to about 2:1. This lens also exhibits an oxygen transmissibility of greater than 45 Dk units and a water content at equilibrium hydration of about 35 to about 55 weight percent.

A co-polymerization product of a monomer mixture comprising (a) a non-ionic hydrophilic monomer, (b) a poly (dimethylsiloxy)silyl group-containing monomer, (c) a tris (siloxy)silyl group-containing monomer, (d) a hydrophobic monomer, and (e) a cross-linking agent comprises yet another contemplated contact lens. The monomer mixture includes a weight ratio of tris(siloxy)silyl group-containing monomer to hydrophilic monomer of about 0.3:1 to about 2:1, and exhibits a water content on equilibrium hydration of at least 20 weight percent to about 55 weight percent and an oxygen permeation value of about 55 to about 120 Dk units.

A contact lens that comprises a co-polymer of (a) a non-ionic hydrophilic monomer, (b) a tris(siloxy)silyl group-containing monomer, (c) a cationic monomer, (d) a polyfluorinated monomer, a poly-(dimethylsiloxy)silyl monomer, a hydrophobic monomer (aromatic or non-aromatic monomer) or a mixture of two or three of those monomer types and (e) a cross-linking agent is also contemplated. This lens exhibits an oxygen transmissibility of about 45 to about 150 Dk units, and a water content at equilibrium hydration of about 20 to about 55, and preferably about 35 to about 55 weight percent. The lens separately binds mucin and lysozyme in vitro at a ratio by weight of about 1:2 to about 2:1 and in an amount of about 0.75 to about 2.5 $\mu g/cm^2$, when those proteins are separately present at initial concentrations of 0.46 g/L in aqueous buffers at a pH value of 7.2–7.6.

A polymerization process (or method) is also contemplated. In this process, an ophthalmic contact lens is prepared by the co-polymerization of a monomer mixture that is thermally polymerized in a filled and closed casting cup for time period of about ten to about fifteen minutes at a temperature of about 110 to about 140° C., and more preferably at about 120 to about 135° C. A contemplated monomer mixture comprises (a) a hydrophilic unsubstituted, mono- or di-substituted $C_1$–$C_4$-alkyl acrylamide or methacrylamide monomer, (b) a tris(siloxy)silyl group-containing monomer, (c) a polyfluorinated monomer, a cationic monomer, a hydrophobic non-aromatic monomer, hydrophobic aromatic monomer or a poly(dimethylsiloxy) silyl group-containing monomer or a mixture of two, three, four or five of those monomer types and (d) a cross-linking agent, in weight ratios discussed elsewhere herein. On completion of the polymerization, the casting cups are cooled, opened, the lenses are removed and the lenses are hydrated for use. A lens so prepared exhibits an oxygen permeability of about 45 to about 120 Dk units and a hydrated water content of about 20 to about 55 weight percent upon hydration.

A further process contemplates an improvement in forming ophthalmic lenses by co-polymerization of a monomer mixture that comprises (a) a non-ionic hydrophilic monomer that is a methacrylamide or acrylamide and (b) a tris(siloxy) silyl group-containing monomer. The improvement comprises wet casting the lenses from a composition that includes those monomers and a non-co-polymerizable solvent that is miscible in the monomer mixture and is readily removable from the co-polymerized lens. In particularly preferred practice, the monomer mixture also includes (c) a poly-(dimethylsiloxy)silyl monomer.

The present invention has several benefits and advantages.

An advantage of the invention is the provision of an ophthalmic lens that provides oxygen sufficient to permit wear of the lens without inflammation or infection for prolonged periods of time.

One benefit of the invention is the provision of an ophthalmic lens that provides water content sufficient to permit wear of the lens without inflammation or infection for prolonged periods of time.

Still further benefits and advantages of the invention will be apparent to a worker of ordinary skill from the discussion that follows.

BRIEF DESCRIPTION OF THE DRAWINGS

In the drawing forming a part of this disclosure,

FIG. 4 is a phase diagram for the system MD9/TRIS/DMA wherein all numbers are in weight percents, horizontal hatching represents a hazy monomer mixture and polymer, vertical hatching represents creamy monomer composition and opaque polymer, and the remaining compositions of monomer and polymer within the diagram are clear.

Definition of Terms

Figure 1:
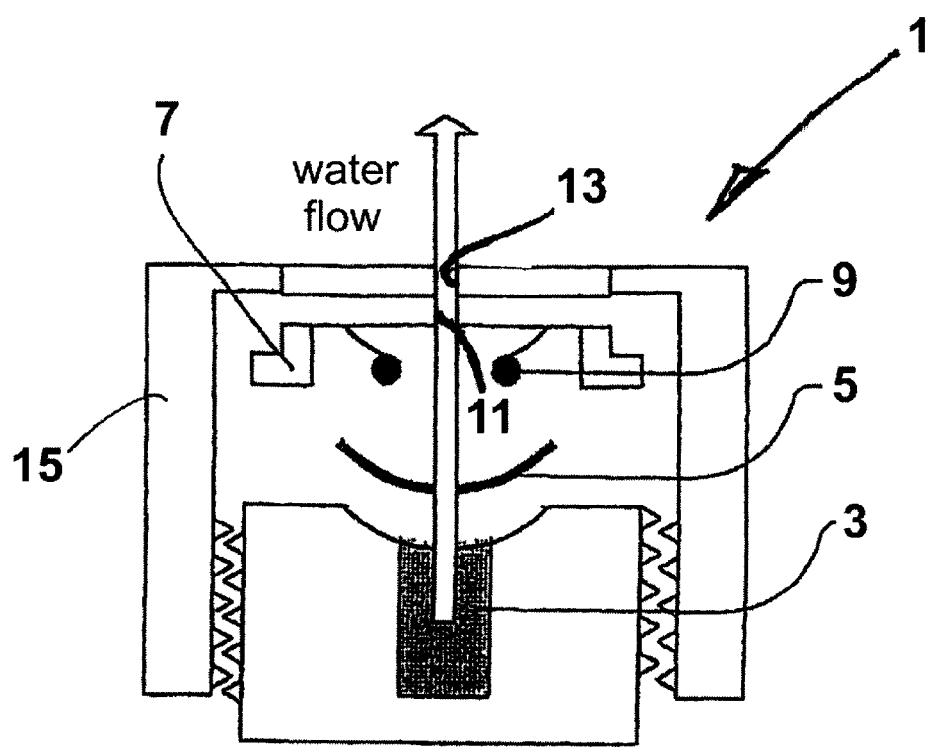
FIG. 1 is a cross-sectional view of the lens holder apparatus for measuring the water flux through a contact lens.

The term "monomer" as used herein, refers to a compound that can either be polymerized, or that can be co-polymerized with other monomers under polymerization conditions.

The term "cationic monomer", as used herein, refers to a monomer having a pendent functional group that exhibits a cationic (positive) charge either permanently or through protonation in water at physiological pH values; i.e., pH 7.2–7.4.

The term "polymerization conditions" refers to conditions under which the polymerization of one or more monomers into a polymer is accomplished. Suitable conditions are well-known in the art and can include use of an activator or initiator such as (2,2-azobisisobutyronitrile (AIBN), use of UV or ionizing radiation, use of heat, use of microwave energy, or combinations thereof to initiate and propagate the free-radical polymerization chain reaction.

The terms "copolymer", "co-polymerization", and "co-polymerizable" as used herein refer to a polymer prepared from two or more monomers, or the reaction in which those two or more monomers react, and a monomer's ability to be polymerized with at least one other monomer, respectively. These terms are not limited to only a two monomer polymer system.

An "ophthalmic lens", as used herein, refers to a lens placed in intimate contact with the eye or tear fluid, such as contact lenses for vision correction (e.g., spherical, toric, bifocal), contact lenses for modification of eye color, ophthalmic drug delivery devices, ocular tissue protective devices (e.g., ophthalmic healing promoting lenses), and the like. A particularly preferred ophthalmic lens is a contact lens for vision correction.

A "polymerizable material that polymerizes to form a polymer having a high oxygen permeability" as used herein, refers to monomers, oligomers, macromers, and the like, and mixtures thereof, that are polymerized with like or unlike polymerizable materials to form a polymer that displays a relatively high rate of oxygen permeability therethrough. For convenience of reference, these materials will be referred to herein as "polymerizable materials" and the resultant polymers will be referred to herein as "ophthalmic polymers".

The "oxygen permeability" of a lens, as used herein, is the rate at which oxygen will pass through a specific ophthalmic lens. Units of oxygen permeability are expressed in "barrers", where a "barrer" is defined as:

$$\left(\frac{(\text{mL oxygen})(\text{cm}^2)}{(\text{mL})(\text{sec})(\text{mm Hg})}\right) \times 10^{-11}$$

The above-defined units are those commonly used in the art.

"Ophthalmically compatible", as used herein, refers to a material or surface of a material that can be in intimate contact with the ocular environment for an prolonged period of time without significantly damaging the ocular environment and without significant user discomfort. Thus, an ophthalmically compatible contact lens does not produce significant corneal swelling, adequately moves on the eye with blinking to promote sufficient tear exchange, does not have substantial amounts of lipid or protein adsorption, and does not cause substantial wearer discomfort during the prescribed period of wear.

"Ocular environment", as used herein, refers to ocular fluids (e.g., tear fluid) and ocular tissue (e.g., the cornea) that come into intimate contact with a contact lens used for vision correction, drug delivery, wound healing, eye color modification or other ophthalmic applications.

"Hydrophilic", as used herein, describes a material or portion thereof that readily associates with water. The word "hydrophilic" derives from the Latin meaning water-loving but, herein shall mean as described above.

"Hydrophobic", as used herein, describes a material or portion thereof that does not readily associate with water. The word "hydrophobic" derives from the Latin meaning water hating but, herein shall mean as described above.

A "hydrophilic surface", as used herein, refers to a surface upon which water spreads or that is wet by water.

The "outer surface" of a lens, as used herein, refers to the surface of the lens that faces away from the eye during wear. The outer surface, which is typically substantially convex, can also be referred to as the front curve of the lens.

The "inner surface" of a lens, as used herein, refers to the surface of the lens that faces towards the eye during wear. The inner surface, which is typically substantially concave, can also be referred to as the base curve of the lens.

DETAILED DESCRIPTION OF THE INVENTION

The present invention is directed to an ophthalmic lens that is suited to prolonged periods of wear in continuous, intimate contact with ocular tissue and ocular fluids. A contemplated ophthalmic lens comprises a polymeric material that has an oxygen permeability of about 45 to about 150 Dk and a hydrated water content of about 20 to about 55 weight percent, and preferably about 35 to about 55 weight percent. A contemplated lens can be surface treated as by plasma treatment or chemical reaction to enhance wearing time.

The polymeric material is comprised of a co-polymer of (a) a hydrophilic polymerizable material, (b) a hydrophobic (aromatic, aliphatic or mixture) monomer, (c) a tris(siloxy) silyl group-containing monomer, (d) a fluorinated monomer containing about 3 to about 20 fluorine atoms per monomer molecule and (e) an amount of cross-linker sufficient to provide a stress at break value of about 0.003 to about 30 $N/mm^2$, elongation at break of about 25 to about 3000 percent and a modulus value of about 0.001 to about 10 $N/mm^2$.

A contemplated lens permits oxygen permeation in an amount sufficient to maintain corneal health and wearer comfort during a period of prolonged, continuous contact with ocular tissue and ocular fluids. Upon hydration, this lens contains enough bulk water content that corneal health is not substantially compromised and wearer comfort is acceptable during a period of prolonged, continuous contact with ocular tissue and ocular fluids. A contemplated ophthalmic lens has a water content of at least 20 weight percent, measured gravimetrically or by refractometer, and preferably greater than about 30 weight percent upon full (equilibrium) hydration, up to about 65 weight percent. Usual values are about 35 to about 55 weight percent.

In a second embodiment of this invention, the polymeric contact lens material comprises a co-polymer of (a) a non-ionic hydrophilic monomer, (b) a hydrophobic (aromatic, aliphatic or mixture) monomer, (c) a tris(siloxy) silyl group-containing monomer, (d) a fluorinated monomer containing about 3 to about 20 fluorine atoms per monomer molecule (polyfluorinated monomer) and (e) a cross-linking agent. The weight ratio of the tris(siloxy)silyl group-containing monomer to the non-ionic hydrophilic monomer is about 0.3:1 to about 2:1. This lens material has an oxygen permeability of greater than about 60 Dk units, and a water content at equilibrium hydration of about 20 to about 55, and preferably about 35 to about 55 weight percent.

In a third embodiment of this invention, a polymeric contact lens comprises a co-polymerized (a) non-ionic hydrophilic monomer containing a methacrylamide, an acrylamide, a methacrylate ester or an acrylate ester group, (b) a hydrophobic (aromatic, aliphatic or mixture) monomer, (c) tris-(siloxy)silyl group-containing monomer, (d) a fluorinated monomer containing about 3 to about 20 fluorine atoms per monomer molecule and (e) a cross-linking agent. Here, the weight ratio of the tris(siloxy)silyl group-containing monomer to the non-ionic hydrophilic monomer is about 0.3:1 to about 2:1. This lens exhibits an oxygen transmissibility of about 60 to about 150 Dk units and a water content at equilibrium hydration of about 20 to about 55, and preferably about 35 to about 55 weight percent.

In a fourth embodiment of this invention, a polymeric contact lens comprises a co-polymerized (a) a non-ionic hydrophilic monomer containing a methacrylamide, an acrylamide, a methacrylate ester or an acrylate ester group, (b) a fluorinated monomer containing about 3 to about 20 fluorine atoms per monomer molecule, (c) a tris(siloxy)silyl group-containing monomer, (d) a styrene-containing monomer and (e) a cross-linking agent. The weight ratio of the tris(siloxy)silyl group-containing monomer to the non-ionic hydrophilic monomer is about 0.3:1 to about 2:1. This lens exhibits an oxygen transmissibility of about 45 to about 150 Dk units, preferably greater than 45 Dk units, and more preferably greater than 60 Dk units, and a water content at equilibrium hydration of about 20 to about 55, and preferably about 35 to about 55 weight percent.

In a fifth embodiment of this invention, a polymeric contact lens comprises a co-polymerized (a) a non-ionic hydrophilic monomer containing a methacrylamide, an acrylamide, a methacrylate ester or an acrylate ester group, (b) a fluorinated monomer containing about 3 to about 20 fluorine atoms per monomer molecule, (c) a tris(siloxy)silyl group-containing monomer, (d) a hydrophobic $C_1$–$C_{10}$ acrylate or methacrylate monomer and (e) a cross-linking agent. The weight ratio of the tris(siloxy)silyl group-containing monomer to the non-ionic hydrophilic monomer is about 0.3:1 to about 2:1. This lens exhibits an oxygen transmissibility of greater than 50 Dk units and a water content at equilibrium hydration of about 35 to about 55 weight percent.

In a sixth embodiment, a contemplated contact lens is the co-polymerization product of a monomer mixture comprising (a) a non-ionic hydrophilic monomer, (b) a tris(siloxy) silyl group-containing monomer, (c) a hydrophobic aromatic monomer such as a styrene-containing monomer, (d) a polyfluorinated monomer, a cationic monomer, a hydrophobic non-aromatic monomer or a mixture of two or three of those monomer types and (e) a cross-linking agent. The monomer mixture includes a weight ratio of tris(siloxy)silyl group-containing monomer to hydrophilic monomer of about 0.3:1 to about 2:1, and a weight ratio of tris(siloxy) silyl group-containing monomer to a single monomer or monomer mixture of (d) of about 1.5:1 to about 20:1; the polyfluorinated monomer, cationic monomer, hydrophobic non-aromatic monomer or mixture of two or three of those monomer types is present up to about 35 weight percent. This lens also exhibits an oxygen transmissibility of about 45 to about 150 Dk units and a water content at equilibrium hydration of about 35 to about 55 weight percent.

In a seventh contemplated embodiment, a contact lens is formed from the co-polymerization product of a monomer mixture comprising (a) a non-ionic hydrophilic monomer, (b) a cationic monomer, (c) a tris(siloxy)silyl group-containing monomer, (d) a hydrophobic aromatic monomer such as a styrene-containing monomer, and (e) a cross-linking agent. The monomer mixture includes a weight ratio of tris(siloxy)silyl group-containing monomer to hydrophilic monomer of about 0.3:1 to about 2:1. This lens also exhibits an oxygen transmissibility of about 45 to about 150 Dk units, and preferably greater than 45 Dk units, and a water content at equilibrium hydration of about 35 to about 55 weight percent.

In a eighth embodiment of this invention, a contact lens is formed from the co-polymerization product of a monomer mixture comprising (a) a non-ionic hydrophilic monomer, (b) a poly-(dimethylsiloxy)silyl group-containing monomer, (c) a tris(siloxy) silyl group-containing monomer, (d) a hydrophobic monomer, preferably, a hydrophobic aromatic monomer such as a styrene-containing monomer, and (e) a cross-linking agent. The monomer mixture includes a weight ratio of tris(siloxy)silyl group-containing monomer to hydrophilic monomer of about 0.3:1 to about 2:1. A contemplated lens exhibits a water content on hydration of at least 20 weight percent up to about 55 weight percent, and a Dk value of about 55 to about 150 units.

In another contemplated embodiment, a method is provided for improving the water content of a contact lens formed from the polymerization product of a monomer mixture comprising a tris(siloxy)silyl group-containing monomer. This method comprises admixing a polyfluorinated monomer, a cationic monomer, a hydrophobic non-aromatic monomer or a mixture of two or three of those monomer types into the monomer mixture in sufficient amount to increase the water content of the contact lens such that the contact lens has reduced corneal adhesion and is suited for continuous wear for prolonged periods in intimate contact with ocular tissue and ocular fluids. In one variant, the water content increases by at least 15 weight percent of the total weight of the hydrated lens as compared to a similar lens free of the polyfluorinated monomer, cationic monomer, hydrophobic aromatic monomer or mixture thereof.

A still further embodiment contemplates an extended wear contact lens that comprises a co-polymer of (a) a non-ionic hydrophilic monomer, (b) a tris(siloxy)silyl group-containing monomer, (c) a cationic monomer, (d) a polyfluorinated monomer, a poly-(dimethylsiloxy)silyl monomer, a hydrophobic monomer (aromatic or non-aromatic monomer) or a mixture of two or three of those monomer types and (e) a cross-linking agent is also contemplated. This lens exhibits an oxygen transmissibility of about 55 to about 150 Dk units, and a water content at equilibrium hydration of at least 20 weight percent, and preferably about 35 to about 55 weight percent. The lens separately binds mucin and lysozyme in vitro at a ratio by weight of about 1:2 to about 2:1 and in an amount of about 0.75 to about 2.5 $\mu$g/cm$^2$, when those proteins are separately present at initial concentrations of 0.46 g/L in aqueous buffers at a pH value of 7.2–7.6.

Preferred lens bulk water content on complete (equilibrium) hydration, determined gravimetrically or by refractometry, is greater than about 20 weight percent. More preferably, the lens has a water content of about 35 to 50 weight percent, based on the total lens weight. Most preferably, a hydrated lens contains about 40 to about 55 weight percent water. A particularly preferred lens water content is greater then 40 weight percent.

A contemplated lens is a co-polymer of several monomers. Table A, below, provides exemplary approximate amounts of those monomers that can be present in contemplated lenses, along with preferred amounts when a given monomer is present. Inasmuch as all monomers need not be present in a particular lens, the amount of monomer present in Table A can exceed 100 percent.

TABLE A

| MONOMER | WEIGHT % | PREFERRED WEIGHT % |
| --- | --- | --- |
| Hydrophilic | 20–70 | 35–50 |
| Tris(siloxy)silyl | 20–60 | 35–50 |
| Hydrophobic (Aromatic or Aliphatic) | 2.5–4.5 | 3–4 |
| Polyfluorinated | Zero–20 | 8–10 |
| Cationic | Zero–30 | 20–25 |
| Poly-(dimethylsiloxy) silyl, Etc. | Zero–20 | Zero–10 |
| Cross-linker | Zero–2 | 1–2 |

Where a polyfluorinated monomer, cationic monomer and hydrophobic non-aromatic monomer or mixture of two or three of those monomer types is present in a contemplated co-polymer, those monomers can be present at about 30 to about 40 weight percent. Preferably, one or more of those monomers is present at up to about 35 weight percent.

For all the embodiments disclosed herein, the hydrophilic monomers include, but are not limited to (a) hydroxylated $C_1$–$C_4$-alkyl acrylates and methacrylates that illustratively include 2-hydroxylethyl methacrylate (HEMA), 2-hydroxylethyl acrylate (2-HEA), glyceryl methacrylate (GMA), 3-hydroxypropyl methacrylate, 3-hydroxypropyl acrylate, 4-hydroxybutyl methacrylate, 4-hydroxybutyl acrylate, N-vinylpyrrolidone (NVP), a-methylglucoside-6-methacrylate, polyhydroxy sucryl alkyl acrylates, N-(2-hydroxypropyl) methacrylamide, N-methylmethacrylamide, poly(ethyleneglycol)(n) monomethacrylate, (b) poly($C_2$–$C_3$ alkylene ether)(n) mono $C_1$–$C_4$ alkyl ether acrylates or methacrylates such as poly(ethylene glycol)(n) monomethyl ether-monomethacrylate, wherein "n" has an average value of about 12 to about 160, and (c) amide-containing monomers that illustratively include N-vinyl-N-methyl acetamide, vinylmethyl sulfone, N-acryloylmorpholine, N-methacryloyl morpholine, N-acryloyl-piperidine, N-methacryloylpiperidine, acrylamide, methacrylamide, mono- and di-N-$C_1$–$C_{10}$-alkyl, benzyl and phenyl acrylamides and methacrylamides such as N-isopropylacrylamide (N-IPA), N-(t-butyl)acrylamide, N-(octyl) acrylamide, N-decylmethacrylamide N-benzylmethacrylamide, N-phenylmethacrylamide, N,N-dimethylacrylamide (DMA), N,N-dimethylmethacrylamide (DMMA), N,N-dipropylacrylamide, and the like.

A contemplated hydrophilic monomer is non-ionic under conditions of intended use, e.g., the monomer does not exhibit a charge in water at pH values of 6–8, and particularly at pH 7.2–7.4. Thus, anionic monomers that exhibit a negative charge at those pH values are excluded from this class of monomers, as are cationic monomers that exhibit a positive charge at those pH values.

More preferably, the hydrophilic monomers are non-ionic and contain an acrylamide, methacrylamide, an acrylate ester or a methacrylate ester group. These monomers are exemplified by unsubstituted, mono- and di-substituted $C_1$–$C_4$-alkyl acrylamide and methacrylamide, and hydroxylated $C_1$–$C_4$-alkyl acrylate and methacrylate esters. Particularly preferred non-ionic monomers that contain an acrylamide, methacrylamide, and acrylate or methacrylate ester group are selected from the group consisting of HEMA, 2-HEA, GMA, DHPA, 3-hydroxypropyl methacrylate, 3-hydroxypropyl acrylate, 4-hydroxybutyl methacrylate, 4-hydroxybutyl acrylate, DMA and DMMA. N,N-Dimethylacrylamide is most preferred.

Another group of co-monomers contains a vinyl group that is preferably an acrylate or methacrylate, and tris (trimethylsiloxy)silyl group, and has a molecular weight of about 6000 grams per mole or less. Suitable monomers include methacryloxypropyltris(trimethylsiloxy)silane (T1), methacryloxypropyltris(trimethylsiloxydimethylsiloxy) silane (T2), N-[tris(trimethylsiloxy)silylpropyl] methacrylamide (TSMAA), N-[tris-(trimethylsiloxy) silylpropyl]acrylamide (TSAA), N-[tris(trimethylsiloxy) silylpropyl]methacryloxyethyl carbamate (TSMC), N-[tris(dimethylpropylsiloxy)silylpropyl]methacrylamide, N-[tris-(dimethylphenylsiloxy)silylpropyl]methacrylamide, N-[tris (trimethylsiloxy)silylpropyl]methacryloxy-glycerylcarbamate, N-[tris(dimethylethylsiloxy)silylpropyl] methacrylamide, N-[tris(trimethylsiloxy)silylpropyl] methacryloxyacetamide, N-[tris(trimethylsiloxy) silylpropyl]methacryloxymethyl dimethylacetamide, vinyl-tris(trimethylsiloxy)silane, vinyl-tris(dimethysiloxy)silane, allyl tris(trimethylsiloxy)silane, and (3-acryloxypropyl) tris (trimethylsiloxy)silane. A preferred tris(trimethylsiloxy) silyl group-containing monomer is an amide or ester of acrylic acid or methacrylic acid. The monomers referred to as T1 and T2 are particularly preferred for use herein.

The weight ratio of tris(trimethylsiloxy)-silyl group-containing monomer to hydrophilic monomer is typically about 0.3:1 to about 2:1, and is more preferably about 0.6:1 to about 2:1. That ratio is most preferably about 0.7:1 to about 1.4:1, and is often expressed herein as a weight ratio of particularly preferred tris(trimethylsiloxy)silyl group-containing monomer T1 to particularly preferred hydrophilic monomer DMA.

The invention is usually carried out with a hydrophobic aromatic or aliphatic monomer or a mixture of those monomers that is copolymerizable with the selected hydrophilic monomer and tris(trimethylsiloxy)silyl group-containing monomer. Examples of hydrophobic aromatic monomers include styrene, 2,4,6-trimethylstyrene (TMS), t-butyl styrene (TBS) and 2-vinylnaphthalene. Of these monomers, a styrene-containing monomer is preferred. A styrene-containing monomer is defined herein to be a monomer that contains a vinyl group bonded directly to a phenyl group in which the phenyl group can be substituted by other than a fused ring, e.g., as above with one to three $C_1$–$C_6$ alkyl groups. Styrene itself [$H_2C=CH—C_6H_5$] is a particularly preferred styrene-containing monomer. Hydrophobic aliphatic (non-aromatic) monomers include $C_1$–$C_{10}$ aliphatic esters of acrylic acid or methacrylic acid. Exemplary monomers include methyl methacrylate, ethyl methacrylate, methyl acrylate, propyl methacrylate, iso-propyl methacrylate (iso-propyl MA), propyl acrylate, iso-propyl acrylate, butyl methacrylate, hexyl acrylate, octyl methacrylate, decyl methacrylate and the like. Of these monomers, methacrylates are preferred over acrylates, with shorter ester chains ($C_1$–$C_3$) being preferred over longer chains.

The hydrophilic monomer and tris-(trimethylsiloxy)silyl group-containing monomer are also usually co-polymerized with a fluorinated monomer containing 3 to about 20 fluorine atoms per monomer molecule that itself contains 4 to about 20 carbon atoms, and preferably contains about 6 to about 15 carbon atoms, sometimes also referred to a polyfluorinated monomer. A polyfluorinated monomer has a molecular weight of less than about 700 grams per mole. When the terms fluorine-containing or fluorinated monomer are used herein, it should be understood to exclude fluorinated siloxy-containing monomers.

Preferred fluorinated monomers include 2-(N-ethyl-perfluorooctanesulfonamido)-ethylacrylate (FX-13), 2-(N-ethyl-perfluoro-octanesulfonamido)ethyl methacrylate (FX-14), 2,2,2-trifluoroethyl methacrylate (TEM), 1H,1H,7H-dodecafluoroheptyl acrylate (DFHA), hexafluoroisopropyl acrylate, 1H,1H,2H,2H-heptadecafluorodecyl acrylate, pentafluorostyrene (PFS), trifluoromethylstyrene, pentafluoroethyl acrylate, pentafluoroethyl methacrylate, hexafluoroisopropyl acrylate, hexafluoroisopropyl methacrylate (HFIPMA) and the like. A preferred fluorinated monomer containing 3 to about 20 fluorine atoms per monomer molecule is an amide or ester of acrylic acid or methacrylic acid. Particularly preferred fluorinated monomers containing 3 to about 20 fluorine atoms per monomer molecule are FX-13, FX-14 and 1H,1H,2H,2H-heptadecafluorodecyl acrylate that contain 13 or 14 carbon atoms and PFS and HFIPMA that contain six to eight carbon atoms. The most preferred of these monomers are FX-13 and FX-14 that are sulfonamido ethyl esters of acrylic acid or methacrylic acid.

Cationic monomers are also useful in a contemplated ophthalmic lens. Suitable cationic monomer materials have a molecular weight of about 600 grams per mole or less, and include a quaternary ammonium group or a tertiary amine group that can be protonated at a pH value of about 7.2–7.4 (physiological pH values). Illustrative monomers include the tertiary $C_1$–$C_{10}$-alkyl, $C_2$–$C_3$-alkanol, and benzyl aminoethyl or N-morpholinoethyl esters of acrylates and methacrylates such as 2-dimethylaminoethyl methacrylate (DMEAM), 2-N-morpholinoethyl methacrylate (MEM), N,N-diethanolaminoethyl methacrylate, N,N-dimethoxyethylaminoethyl methacrylate, vinyl amine, aminostyrene, 2-vinyl pyridine, 4-vinyl pyridine, N-(2-vinyloxyethyl)piperidine and quaternary ammonium compounds such as 3-trimethylammonium-2-hydroxypropyl methacrylate chloride (TMAHPM), 2-trimethylammoniumethyl methacrylic hydroxide, 2-trimethylammoniumethyl acrylic hydroxide, 2-trimethylammoniummethyl methacrylic chloride, 2-trimethylammoniummethyl acrylic chloride, and 2-methacryloyloxy ethyltrimethylammonium methyl sulfate. A cationic monomer that is an ester of acrylic or methacrylic acid is preferred. When included, a cationic monomer is typically present at about 15 to about 30, and more preferably about 20 to about 25, weight percent. MEM and DMAEM are particularly preferred cationic monomer.

Some aspects of the invention contemplate the co-polymerization of (a) a non-ionic hydrophilic monomer, (b) a tris(siloxy)silyl group-containing monomer, (c) a hydrophobic aromatic monomer such as a styrene-containing monomer, (d) a polyfluorinated monomer, a cationic monomer, a hydrophobic non-aromatic monomer or a mixture of two or three of those monomer types and (e) a cross-linking agent. Polyfluorinated, cationic and hydrophobic non-aromatic (aliphatic) monomer types are as discussed before.

Another class of preferred siloxy monomers are those that contain poly(dimethylsiloxy)silyl-containing group and are typically polysiloxane vinylic monomers that are preferably an ester or amide of acrylic acid or methacrylic acid. Exemplary materials include MD3 (MW=386), MD5 (MW=550), MD9 (MW=1000) and MD63 (MW=5000) that are monomethacryloxypropyl-terminated polydimethyl siloxanes, M2D63 that is a methacryloxy propyl end-blocked dimethyl silicone fluid (MW=5000), M2K2 that is 1,3-bis (3-methacryloxypropyl)tetrakis-(trimethylsiloxy) disiloxane (MW=683.25), and M2D2 that is 1,3-bis (3-methacryloxypropyl)-tetramethyldisiloxane (MW=386.64). The vinyl-terminated polydimethyl siloxanes VD2 (MW=500) and VD5 (MW=770) are also contemplated. Particularly preferred monomers containing a poly (dimethylsiloxy)silyl group are mono-acrylate, methacrylate, acrylamide or methacrylamide compounds linked to a dimethyl silicone portion such as MD9 and MD63; i.e., monomers having molecular weights of about 1000 to about 5000.

A polymerized cross-linker is also usually present in a contemplated ophthalmic lens. Suitable cross-linkers, or cross-linking agents include ethyleneglycol dimethacrylate (EGDMA), 1,6-hexanediol diacrylate (HDODA), 1,4-butanediol diacrylate (BDODA), trimethylolpropane triacrylate (TMPTA), tripropyleneglycol diacrylate (TRPGDA), diethyleneglycol diacrylate (DEGDA), tetraethyleneglycol diacrylate (TEGDA), pentaerythritol triacrylate, pentaerythritol tetraacrylate and the like. EGDMA is particularly preferred.

A co-polymerization containing the desired monomer and cross-linker, when present, also typically contains an of an activator or initiator such as (2,2-azobisisobutyronitrile (AIBN; V-64), t-butyl hydroperoxide, di-t-butyl peroxide and the like as are well known. A sensitizer for UV polymerization can also be present. Co-polymerization by ionizing radiation usually does not require an initiator. As noted before, combinations of polymerization techniques can be used to initiate and propagate the free-radical polymerization chain reaction that is used herein.

The oxygen permeability of the polymer and lens is preferably at least 45 barrers, more preferably at least 50 barrers (greater than 50 barrers), and most preferably at least 60 barrers (greater than 60 barrers). The lens center thickness is typically more than about 50 microns, preferably about 50 to about 200 microns, more preferably about 50 to about 150 microns, even more preferably about 50 to about 120 microns, and most preferably about 60 to about 100 microns.

The oxygen transmissibility of a contemplated lens from the outer surface to the inner surface is sufficient to prevent any substantial corneal swelling during prolonged wear. U.S. Pat. No. 5,760,100 reports it to be known that the cornea swells approximately 3 percent to 4 percent during overnight periods of sleep as a result of oxygen deprivation, and that wearing a typical contact lens, such as ACUVUE® (Johnson & Johnson), for a period of about 8 hours (overnight wear) can cause corneal swelling of about 11%.

A contemplated ophthalmic lens is usually prepared by co-polymerization of constituent monomers neat, in the absence of a diluent or non-co-polymerizing solvent. The molded polymerization of such a composition is often referred to as dry casting. It is noted, however, that the co-polymerization can also be carried out in the presence of a non-co-polymerizing solvent. Such a molded polymerization is often referred to as wet casting.

A non-co-polymerizing solvent for wet casting ophthalmic lenses is miscible in the monomer mixture and is readily removable from the polymerized lens. Exemplary solvent removal methods include evaporation, washing in water or saline or the like. An exemplary solvent is preferably a water-miscible $C_1$–$C_4$ monohydric alcohol solvent such as methanol, ethanol, propanol, iso-propanol, sec-butanol and t-butanol, although other solvents such as acetone, 2-butanone, tetrahydrofuran, benzene and toluene are also contemplated. A wet casting solvent can be present in an amount less than that lowers the provides a stress at break value to 0.03 N/mm². In usual practice, the solvent is present at a concentration of less than about 20 weight percent of the total copolymerization composition, and more preferably at about 15 weight percent or less.

It has been surprisingly found that wet casting; i.e., co-polymerizing lens-forming monomers in the presence of a non-co-polymerizable solvent, can increase the oxygen transmissibility of a formed lens by about 5 to about 20 percent compared to a dry cast lens prepared from the same monomers in the same proportions. (It is noted that "the same monomers in the same proportions" includes slight increases in initiator and cross-linker in the wet cast composition to account for the slight dilution of the composition due to the solvent.) This enhancement in oxygen transmissibility appears to occur in lenses containing (a) a non-ionic hydrophilic monomer comprising a methacrylamide or acrylamide and (b) a tris(siloxy)silyl group-containing monomer that are present in the amounts discussed elsewhere herein, and is particularly evident in those compositions that also include a poly-(dimethylsiloxy)silyl monomer.

Assay Procedures

Bulk Water Content

As used herein, the water content of a lens, unless otherwise noted, is the weight percent of water based on the total weight of the hydrated lens. The measurement of this water content is difficult because the removal of adhered surface droplets, without affecting the bulk lens water content, is not trivial. In addition, water can evaporate from the lens surface quickly, thereby lowering the water content from the equilibrium level. Accordingly, a discussion of the bulk water content of a lens warrants a discussion of the measurement technique used for that determination.

The preferred bulk water content of the hydrated lens is a function of the lens material properties. The material properties are dependent on the pre-polymerization macromers and monomers and polymerization conditions. Thus, the preferred water content for a lens including a fluorine-containing siloxane material can be different from that of a lens including a non-fluorine-siloxane-containing material. Accordingly, although general ranges for bulk water content are offered for a better understanding of the invention, the invention is not generally limited to specific bulk water contents.

One method of measuring the water content of a lens formed in accordance with the present invention is referred to herein as the "Bulk Technique". The Bulk Technique procedure is as follows.

First the lens is thoroughly hydrated in a physiological saline solution (0.9 percent sodium chloride), such that the water in the lens is in equilibrium with the surrounding water. Next the lens is gently blotted between two lint-free blotting cloths to remove surface moisture. The lens is quickly placed on an aluminum weighing pan and the first wet weight, $W_1$, is measured. Next, the aluminum pan with lens is placed in an oven at 36° C. for a period of at least 24 hours. After heat treating, the pan with lens is removed, placed in a desiccator, and permitted to cool to room temperature (about 22° C.). The pan with lens is weighed again to determine the dry weight, $W_d$. The lens is re-equilibrated in physiological saline solution and a second wet weight $W_2$ is determined thereon. The wet weights ($W_1$ and $W_2$) are averaged to yield an average wet weight, $W_w$. The bulk water content is determined by the following equation:

$$\text{Percent water content} = \left[\frac{W_w - W_d}{W_w}\right] \times 100$$

An additional method of measuring the water content of a lens formed in accordance with the present invention, referred to herein as the "Refractometer Technique", utilizes a refractometer such as an Atago™ Refractometer and is as follows:

1. Preparation of Stock Saturated

Salt Solution:

A stoppered glass container is one-half filled with salt (sodium chloride), deionized water is preheated to 40–45° C. and is added until the container is three quarters full. A Teflon-coated stopper is used to seal the container. The container is shaken for 2 minutes, then stirred for 30–60 minutes. The supernatant of this solution is used to calibrate the refractometer's scale. If all of the salt is dissolved in the solution (that is, there is no salt remaining at the bottom of the container), additional salt is added until there remains a residue that will not dissolve. The mixture is cooled to room temperature.

2. Scale Adjustment:

The scale is calibrated at room temperature. The daylight plate is opened, and a few drops of the saturated salt solution are placed on the prism surface using a disposable pipet. The daylight plate is closed. The solution should cover the whole prism surface when the daylight plate is closed. The boundary between the upper and lower parts of the field are aligned with the "S" marking on the scale.

3. Measurement Technique:

The lens is lightly dabbed with a soft lint-free tissue to remove excess surface moisture. The daylight plate is opened and the lens is placed on the center prism with the convex surface of the lens facing downward. The central portion of the lens is in opposition with the prism surface. The daylight plate is gently closed with the application of light pressure to the top of the plate so that the lens is between the daylight plate and prism. The eyepiece is focused so that the scale can be clearly observed. The upper portion of the field of view should appear blue, and the lower portion white. The position of the boundary between the upper and lower parts of the field indicates the water content in weight percent of the lens, which is read off the vertical scale.

Corneal Movement and Adhesion

It has been recently proposed in the art that ion permeability through the lens correlates well with on-eye movement. As discussed earlier, it is known that on-eye movement of the lens is desired to ensure good tear exchange, and ultimately, to ensure good corneal health. Although not wishing to be bound by the hypothesis presented herein, it is thought useful to discuss a few possible mechanisms to prevent corneal adhesion to better understand ways to practice the invention.

It is proposed that water permeability is one important feature for an extended-wear lens. Siloxane-containing materials tend to adhere strongly to the eye, thereby stopping on-eye movement via forces exerted by water being squeezed out of the lens. The ability to pass water through the lens is thought to permit a polymeric lens to relax and continue to move on the eye. The water permeability of the lens is also believed important in replenishing lens water content once pressure is removed. Indeed, the lack of sufficient ophthalmic fluids under the lens may contribute to adhesion of the lens to the cornea. Thus, water permeability is thought to be one predictor of on-eye movement.

Others have been heavily involved in trying to solve the corneal adhesion problem to develop a 30-day extended wear lens. Nicholson et al., U.S. Pat. No. 5,760,100, for example, theorized that a certain water permeability is required for proper tear exchange to reduce corneal adhesion. They measured ion or radio-labeled glucose flux as a pseudo-indicator of the amount of water flowing through the contact lens. Those inventors assert that the ion diffusivity coefficient should be greater than $2.6 \times 10^{-6}$ mm$^2$/min to permit on-eye movement.

Measured Lens Properties

Lens diameters were determined using a machinist's microscope, whereas center thickness was measured using a Rehder™ Electronic Thickness Gauge (Model ET-3). Lens power was determined on a Topcon™ LM-P5 Digital Lensmeter. Water content was measured using an Atago™ refractometer according to the "Refractometer Technique™" described above. Oxygen permeability measurements were performed by Mocon Corp. (Minneapolis, Minnesota) according to their OptiPerm™ technology, as described in U.S. Pat. No. 5,817,924, whose disclosures are incorporated by reference. In-house laboratory oxygen permeabilities were determined using a Rosemount Scientific dissolved oxygen sensor (model 499 A DO) connected to a Rosemount microprocessor analyzer (model 1054B). This system measures Dk values in a method similar to the ANSI Standards (ANSI:Z80.20 Standard terminology, tolerances, measurements and physiochemical properties. Contact lenses 1996) method with a slightly different electrode configuration.

The analyzer was calibrated using standard contact lens materials. Methods and calculations used to perform Dk measurements on the soft contact lenses are as discussed herein below. Fresh borate-buffered saline, pH 7.48, was made prior to use. All water content numbers were measured using the Atago™ hand refractometer (Model CL-1, Japan), with contents lower than 35 percent being estimated.

The contact lens was mounted in a lens holder over the oxygen sensor. Any air bubbles were removed, and the apparatus was immersed in physiological saline solution kept at a temperature of 37° C. with a circulating water bath. After an equilibration time, the oxygen level with the lens on the sensor was compared to the level without the lens in place. The corresponding oxygen permeability can be calculated from the following formula:

$$P = \frac{L}{L_t} \frac{P_r}{(P_o - P_r)} K$$

wherein

P=Dk; permeability value (barrers);

L=lens sample thickness (mm);

$L_t$=Teflon® membrane thickness covering oxygen sensor (0.05 mm for supplied membranes);

$P_r$=steady state oxygen transport across the lens and Teflon® membrane (ppm);

$P_o$=steady state oxygen transport across the Teflon® membrane, lens absent (ppm, usually 6.4);

K=a constant determined from reference lenses (Dk); typically between 9–14 Dk units.

ATR Protein Assay

For this in vitro assay, a lens is placed in the appropriate protein solution (normally lysozyme concentration of 0.46 g/L to simulate physiological conditions) for the desired length of time. The lens is rinsed, blotted, and placed on the ATR crystal. After normalization and subtraction with a stored control spectrum, the presence of protein can be observed by examination of the Amide I and II peaks. The amount of protein can be determined by comparing the absorbance at these wavelengths with a calibration curve. This analysis method can determine the amount of protein deposited on a contact lens exposed to a protein solution or worn.

Equipment Required:

1. FTS-20 Infrared Spectrometer (Bio-Rad®)
2. ATR accessory (4091-0507B, Bio-Rad®)
3. ZnSe crystal (# 989-0160, 84 mm×9 mm×6 mm, Bio-Rad®)
4. pH meter
5. 10 μL Eppendorf micropipette Supplies needed:

1. 0.9% Sodium chloride irrigation solution, USP (Baxter), 1.5 L
2. 8.4% Sodium bicarbonate solution, USP (Abbott Laboratories)
3. 10 mL injection syringe
4. Kimwipes®
5. Lysozyme, lyophilized, from chicken egg whites (Sigma, L6876)
6. 100 mL volumetric flask
7. Plastic tweezers Procedure Buffered normal saline solution should be made prior to experimentation. Briefly, 0.25 mL of sodium bicarbonate buffer is added to 1.5 L of sodium chloride irrigation buffer using a sterile 10 mL injection syringe. The solution has a pH value between 7.6–7.2. Lysozyme dilution is performed using glass 100 mL volumetric flask.

1. Lysozyme Calibration Curve

The ATR accessory is placed in the IR light path, as directed by the ATR accessory manual. The interferogram center burst verifies that the crystal is aligned in the IR beam (~0.85 V in amplitude). The IR parameters should be as follows: open aperture, 5 kHz scan speed, and 1.5 kHz low pass filter.

The ZnSe crystal is cleaned by brushing the surface with a Kimwipe®-wrapped cotton swab soaked with 1–2 drops of methanol. No methanol signal should be evident on the crystal after a few seconds of air drying. A background single-beam spectrum is obtained by signal-averaging 32 scans.

Control spectra of each contact lens material are obtained from fresh lenses from production. Each lens is removed from its storage solution using polypropylene tweezers and placed on a Kimwipe®. Excess buffer solution is removed by blotting the lens with another Kimwipe®; any visible buffer makes subtraction of the contact lens substrate more difficult. The lens is placed on the ZeSe crystal and compressed using the ATR sample holder to increase absorbance. This area is calculated to be approximately 1.215 $cm^2$ for a 14.5 mm contact lens on the 9 mm wide crystal. Subsequent studied lenses are compressed to make the absorbance peak at 1,703 $cm^{-1}$ the same as this control peak (within about 0.01 absorbance units). This normalizes the spectra, ensuring the lens contact areas are identical. Other peaks could be used for normalization, but this peak is convenient for acrylic-type hydrogels.

A lysozyme calibration curve is constructed by placing known concentrations of lysozyme solution on the ZnSe crystal using a 10 $\mu$L Eppendorf pipette when analyzing a new contact lens material. Approximately 10 drops of the solution are spread over the crystal to ensure monolayer protein coverage. A drying time of 15 minutes is used, based upon visible and IR observations. A spectrum of each protein concentration is made by signal averaging 32 scans.

The Amide II peak height at 1,540 $cm^{-1}$ is used to construct a calibration curve. This particular peak has less error from overlapping water bands compared with the Amide I peak. A least square fit linear regression model provides an equation relating deposited protein to absorbance (absorbance units; a.u.) of the Amide II peak:

$$A(a.u.) \times 491.617 = \text{(protein deposited in } \mu g\text{)} \quad (1)$$

2. Protein Deposits on Lenses

Each lens to be assayed is placed within a vial containing the protein solution of interest (typically 0.46 g/L lysozyme in buffer solution is used). The sample vials are sealed and placed in a water bath at 37° C. for the desired duration. The lenses are removed from the bottle, blotted dry with Kimwipes®, and placed on the ATR-FTIR for analysis. The spectrum is adjusted with the sample holder to make the 1703 $cm^{-1}$ peak height the same as the control lens (see above). The control contact lens spectrum is used to subtract the absorbance due to the substrate. This results in a spectrum of the residual proteins deposited on the lens. The protein concentration deposited on the surface of the lens now can be determined from the calibration curve.

Water Flux

Rather than measuring ion permeability, one can directly measure the actual water flow rates; i.e., water flux, through these lenses. This provides a more physiological representation of how water can transport across a lens and air-lens interface. A lens made in accordance with the present invention typically has a significantly larger water flow rate than the prior art lenses made from silicon-containing monomers. Preferably, the water flux is greater than about 0.40× $10^{-5}$ $g/cm^2$-sec. More preferably, the water flux is greater than about 0.50× $10^{-5}$ $g/cm^2$-sec. With the higher water flux, a contemplated lens can exhibit a higher tear exchange rate and is less likely to adhere to human eyes, although a surface treatment can still be required to provide a desired amount of movement of a lens on the eye. A reliable method to measure water flow is described as follows:

Procedure:

An experimental apparatus 1 is shown in cross-section in FIG. 1. This device is filled with a buffer solution 3 (11.3 mM sodium chloride, 8.1 mM boric acid, 0.3 mM sodium borate, pH 7.2–7.5; hereinafter borate-buffered saline) and a contact lens 5 is placed on top. A cover 7 is placed over the lens with an o-ring 9 pressing the lens against the lens holder. A 6.3-mm hole 11 in the cover permits water to flow from the lens holder reservoir through the lens and out the cover. The lens cover has a matching hole 13 for water passage, and is fixed in place with a screw ring 15. Excess buffer solution is removed with an absorbent wipe.

The entire water flow apparatus is placed on an AE200 Mettler® balance. The balance is enclosed in a glove bag (Aldrich AtmosBag®, Z11, 282–8), which is sealed rapidly with a quick closing glove bag clamp ($I^2R$, AC-24). Air is passed through a bubbler into the bag. The bubbler is filled with a glycerol/water mix (69.4% w/w glycerol) to bring the relative humidity inside the bag to about 50% after 5–10 minutes. The relative humidity and temperature are monitored using a Mannix® model LAM 880D pocket thermohygrometer. The reading on the Mettler® balance is monitored by a data acquisition program.

One embodiment of the invention uses a cationic monomer in the lens polymer material and provides a prolonged wear lens. This embodiment involves the attractive ionic forces between a cationic polymer and an anionic mucin layer of the tear film to adhere mucin to the lens.

It is believed that a cationic-modified base lens can prevent corneal adhesion through attraction of the tear mucin layer. Silicones have low surface energy and can repel the mucinous layer that makes up the foundation of the ocular tear film. This disruption of the tear film may be a reason for adherence of a contact lens to the cornea even with lenses having high water flow. A lens with a formal positive charge at physiologic pH values (e.g., about 7.2–7.4) can electrostatically attract and deposit the negatively-charged mucin layer.

A contemplated prolonged wear contact lens comprises a co-polymer of (a) a non-ionic hydrophilic monomer, (b) a tris(siloxy)silyl group-containing monomer, (c) a cationic monomer, (d) a polyfluorinated monomer, a poly-(dimethylsiloxy)silyl monomer, a hydrophobic monomer (aromatic or non-aromatic monomer) or a mixture of two or three of those monomer types and (e) a cross-linking agent is also contemplated. This lens exhibits an oxygen transmissibility of about 45 to about 150 Dk units, and a water content at equilibrium hydration of about 35 to about 55 weight percent. The lens separately binds mucin and lysozyme in vitro at a ratio by weight of about 1:2 to about 2:1 and in an amount of about 0.75 to about 2.5 $\mu g/cm^2$, when those proteins are separately present at initial concentrations of 0.46 g/L in aqueous buffers at a pH value of 7.2–7.6. Thus, in separate in vitro studies, the lens binds both lysozyme and mucin in similar amounts (about 1:2 to about 2:1 by weight), and preferably in about the same amount (about 1:1) using the assay discussed elsewhere herein in which each protein is initially present at 0.46 g/L in an aqueous buffer having a pH value of about 7.2–7.6. The particular buffer is not thought to be particularly important. However, it is preferred to use a sodium bicarbonate buffer.

Regardless of the mechanism of improved ocular movement, it has been unexpectedly found that contemplated contact lenses that include a cationic or hydrophobic monomer provide high water content and oxygen permeability (Dk value), as compared to lenses known in the art.

EXAMPLES

The following examples illustrate the invention and permit one of ordinary skill in the art to practice the invention. The following tables delineate polymer formulations and resultant properties of contact lenses made according to several embodiments of the invention.

All monomers were purchased from Gelest, Inc., (Tullytown, Pa.), except where noted. MD9 (lot 86-6126, MW=1000) and MD63 (lot 95H-1068, MW=5000) are monomethacryloxypropyl-terminated polydimethylsiloxanes. M2D63 is a methacryloxy propyl end-blocked dimethyl silicone fluid (#GP-478, Genesee Polymer Corp, Flint Mich., MW=5 kD). M2K2 is 1,3-bis(3-methacryloxypropyl) tetrakis-(trimethylsiloxy)disiloxane (SIB 1400.0, MW=683.25). M2D2 is 1,3-bis(3-methacryloxypropyl)-tetramethyldisiloxane (SIB 1402.0, MW=386.64). T-1 is methacryloxypropyltris(trimethylsiloxy) silane (MW= 422.82, lot 98-6898). 2,4,6-Trimethylstyrene (TMS), dimethylacrylamide (DMA), 2-N-morpholinoethyl methacrylate (MEM) and octyl methacrylate (OMA) were purchased from Monomer-Polymer & Dajac Labs (Feasterville, Pa.), whereas methyl methacrylate (MMA), styrene and 4-t-butylstyrene were purchased from Aldrich Chemical Co., (Milwaukee, Wis.).

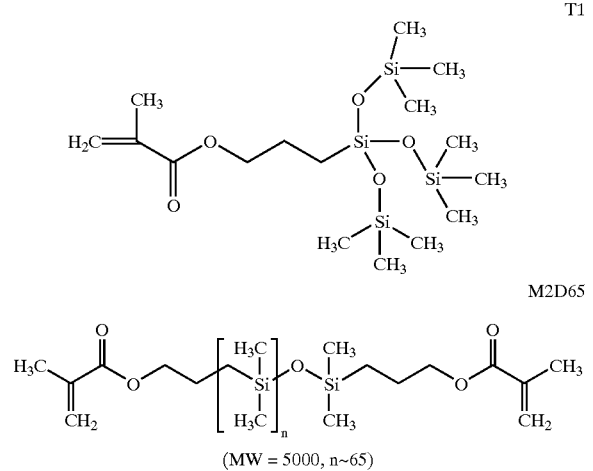

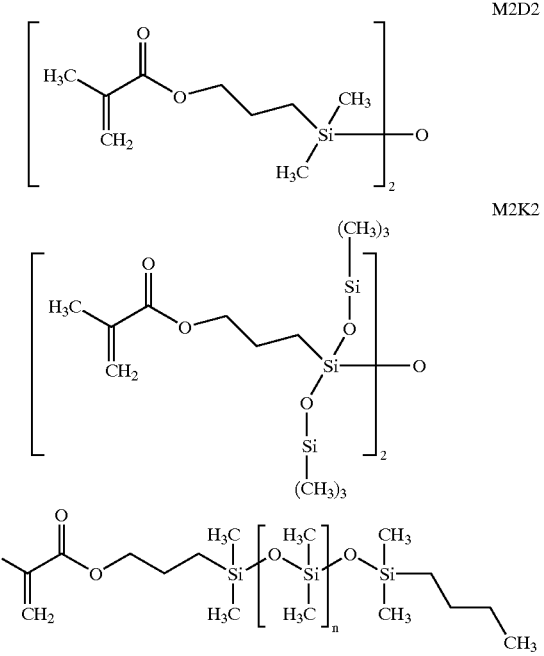

MD3 (MW=about 390, n about 3)
MD5 (MW=about 550–700, n=about 5)
MD9 (MW=about 1000, n=about 9)
MD63 (MW=about 5000, n=about 63)

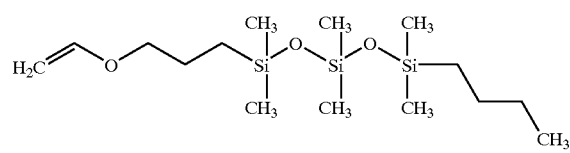

VD2 (MW=about 500)

GentleTouch™ and Freshlook™ lenses were obtained from Wesley Jessen Corporation, Des Plaines, Ill. Other lenses were purchased from their manufacturers.

The various samples were prepared for dry casting, in which 400 μL of the monomer solution were placed in the female part of a casting cup, the male part placed in the female part, and the excess was evacuated off. After polymerization, the lenses were removed and then hydrated overnight (about eighteen hours) in borate-buffered saline (pH 7.48) before being transferred to contact lens (CL) vials containing packaging solution for storage.

FreshLook™ casting cup molds were used from production (−3.00 or −0.50 D/14.5 mm dia/8.25 thick). Filling was done with an Eppendorf combitip plus 5 mL tip set at delivering 300–400 μL of monomer solution. Closing was done with a laboratory filler/closer (in hood). The Despatch™ (model LN01-42-2, Minneapolis, Minn.) oven was used for thermal polymerization.

The polymer formed according to the formulations given in the following tables was accomplished according to either procedure A, B, or C.

Procedure A

The monomers are mixed in the order of their mass, from lowest to highest. The mixtures were stirred sufficiently to form a homogeneous solution. Casting cups normally used in the art were prepared according to known techniques including corona activation of the male part. The reaction mixture previously prepared was placed in the female part of the casting cups. The casting cups were closed and placed in a reaction chamber. The atmosphere is removed by vacuum and replaced with an inert atmosphere such as $N_2$. The monomer mixture was subjected to UV energy sufficient to cause polymerization. Suitable UV energy to cause polymerization is about 0.7 mW/cm² to about 3 mW/cm² for between 1 to 6 hours, preferably for 2 hours.

Procedure B

An ophthalmic lens according to this procedure is formed following the mixing procedure presented in Procedure A except that final polymerization is accomplished through thermal energy initiation of the free radical chain reaction. Any temperature range suitable to cause polymerization of the mixture of monomers is acceptable. Suitable temperature ranges include between about 60° C. to 150° C. and preferably between 80° C. and 120° C. for a period of time to permit the desired polymerization to occur. Suitable periods of time for accomplishing the desired polymerization are about 0.25 to about 4 hours, preferably about 2 to about 4 hours, and most preferably about 4 hours. The ambient atmosphere in the oven can be partially or completely replaced with an inert gas such as nitrogen or argon.

It is often desirable to combine the above two procedures such that UV initiated polymerization is also caused to cure under thermal polymerization conditions, and vice versa. Additionally, one technique can be used to post cure lenses prepared by the other technique.

Procedure C

The monomer-filled and closed casting cups are placed in a steel block autoclave at a predetermined minimum temperature such as about 110° C. The monomer mixture is thermally polymerized for a time period of about ten to about fifteen minutes at a temperature of about 110 to about 140° C. and more preferably at about 120 to about 135° C., after which time the casting cups are removed, opened, the lenses removed and hydrated as discussed before. A similar high temperature fast polymerization can also be carried out in a Despatch™ oven (Model LN01-42-2, Minneapolis, Minn).

Interestingly, when this polymerization procedure was used with a formulation containing HEMA as the non-ionic hydrophilic monomer in place of an amide-containing monomer such as an unsubstituted, mono- and di-substituted $C_1$-$C_4$-alkyl acrylamide and methacrylamide such as DMA, the resulting lens was opaque rather than being clear. In addition, this polymerization procedure can be used in the presence of atmospheric oxygen as well as in the presence of an inert atmosphere such as argon or nitrogen.

Results

Comparative Example A: Water Flow Studies

Following the above procedure, various manufactured contact lenses were measured for water flow. FreshLook™ lenses (−3.00 D, Dia. 14.5, BC median, lot 44555, exp. 12/00, center thickness=92 μm), GentleTouch™ lenses (−3.00 D, Dia. 14.5, BC 8.5, lot WBYNT, exp. ⅓, center thickness=137 μm). Clearview™ lenses (0.00 D, Dia. 13.8, BC 8.4, lot RAALB, exp. 10/99, center thickness=118 μm), and Silsoft™ lenses (elastofilcon, +12 D, Dia 12.5, B.C. 8.3, lot R85008683, exp. 7/00, center thickness=315 μm) were used as received. The base lens (center thickness=127 μm) and modified base lens (center thickness=114 μm) were made according to Examples 0 and 4. All lenses were soaked in borate-buffered saline solution for at least 30 minutes prior to use.

The water loss rate in mg/hour for the different lenses was measured and compared as shown in Table 1, herein below.

TABLE 1

| Material | Water loss (mg/hr) | Water Flux* (x10⁻⁵ g/cm²-sec) | $O_2$ Permeability (barrer, Dk) |
|---|---|---|---|
| Brass | 1.2 | 0.10 | 0 |
| Silsoft™ | 2.4 | 0.20 | 150-200 |
| Base Lens** | 3.8 | 0.32 | 51.5 |
| Modified Base Lens*** | 5.9 | 0.50 | 63 |
| Clearview ™ | 6.2 | 0.53 | 8.4 |
| FreshLook ™ | 6.8 | 0.58 | 18 |
| Borate-Buffered Saline | 9.4 | 0.80 | — |
| GentleTouch ™ | 9.7 | 0.82 | 34.5 |

*For commercially available lenses, the 02 Dk values are from figures published by the respective lens manufacturer.
**Composition shown as Example 0 in Table 2.
*** Composition as shown in Example 4, Table No. 3.

The brass metal has the lowest water loss rate and should provide the error observed from water leakage around the sample holder. Although low, this water leakage rate is measurable. Possibly, the brass does not conform well to the surface of the lens holder, permitting a larger amount of water to seep around the material than with the more compliant contact lenses.

The Silsoft™ lens has a slightly higher water flow than the brass, possibly because of the higher water vapor diffusion rate through the flexible silicone matrix. Again, only water vapor can penetrate the lens, so Silsoft™ shows a low water flow rate compared to the hydrogels. This low water flow rate can cause the high degree of corneal adhesion seen with this material, although repulsion of the mucin layer of the tear film may also account for the observed corneal adhesion.

The original base lens, modified base lens, Clearview™, FreshLook™, and GentleTouch™ lenses exhibited water flow loss rates in order of their water contents. In fact, the GentleTouch™ lens had a water loss rate similar to that of the buffer (no lens) control sample. Apparently, the GentleTouch™ matrix does not impede the flow of water across this material.

Each of the Clearview™, FreshLook™ and GentleTouch™ lenses moved well on the eyes of consenting test subjects. The Modified Base Lens (Example 4), which exhibited an almost identical water flux and superior $O_2$ permeability to the Clearview™ and FreshLook™ lenses, appeared to be exhibiting some adhesion to the subjects' eyes and the non-dispensed clinical study was terminated. It thus appears that water flux, which measures the flow of water through the lens, is possibly less important to lens movement on the eye than has been asserted in the art, as in U.S. Pat. No. 5,760,100. Where lens movement on the eye as a result of the co-polymerized formulation is less than that desired, lenses can be treated by a plasma discharge as discussed in U.S. Pat. No. 5,760,100 to provide the desired movement, or other surface modification techniques known to those skilled in the art, such as those treatments disclosed in WO 99/57177, 99/57178 and 99/57179.

Examples 0–17

Contact Lenses

Table 2 shows the composition of a base lens formulation. Unless noted otherwise, all formulation/composition units are in grams-mass. This lens formulation includes a silicone-containing monomer, T1, a hydrophilic monomer, DMA, small amounts of a styrene-containing monomer, TMS, and a cross-linker EGDMA. But this formulation does not contain a fluorinated hydrophobic monomer. Although this lens formulation exhibits relatively adequate levels of oxygen permeability, it has a low water content measured as a weight percent of the total weight of the hydrated lens. Also, this lens exhibits adhesion to a human cornea that makes it unsuited for prolonged wear.

Examples 1, 2 and 3 demonstrate that the incorporation of a fluorinated monomer, containing 3 to about 20 fluorine atoms per monomer molecule unexpectedly increases the water content of the lens without significant reduction in oxygen permeability. These lenses are believed to not adhere to the human cornea and, thus, are appropriate for prolonged wear.

TABLE 2

| Reagent | Example 0 Base Lens (grams) | Example 1 7% FX-13 (grams) | Example 2 3.5% FX-13 (grams) | Example 3 14% FX-13 (grams) |
|---|---|---|---|---|
| V-64 | 0.3647 | 0.3642 | 0.3631 | 0.3593 |
| EGDMA | 0.4921 | 0.4908 | 0.4876 | 0.4986 |
| TMS | 1.1610 | 1.1588 | 1.1535 | 1.1509 |
| DMA | 13.7084 | 13.7065 | 13.7140 | 13.7158 |
| T1 | 20.7070 | 18.1150 | 19.4100 | 15.5170 |
| FX-13 | Zero | 2.5037 | 1.2360 | 5.1599 |
| Total Mass | 36.4332 | 36.3390 | 36.3642 | 36.4015 |
| T1/DMA | 1.51 | 1.32 | 1.42 | 1.13 |
| % Water | 20 | 39 | 39 | 40 |
| Oxygen Dk | 51.5 | 45.8 | 43.8 | 50.3 |

Table 3 shows the results of varying the amounts of silicone-containing monomer, T1, hydrophilic monomer, DMA, and fluorinated hydrophobic monomer, FX-13 in the lens formulation. Giving considerable weight to the optical clarity of the lens, as well as resiliency to deformation, examples Nos. 4 and 15 (duplicates) appear to have more desirable combined characteristics along with water content and oxygen permeability.

TABLE 4

Compilation of $O_2$ Permeability and Percent Water Data for FX-13-Modified Base Lenses

| Example | % FX-13 | T1/DMA | $O_2$ Dk | % Water |
|---|---|---|---|---|
| Base (0) | Zero | 1.51 | 51.5 | 20 |
| 2 | 3.5 | 1.42 | 43.8 ± 1.7 | 39 |
| 1 | 7.1 | 1.32 | 45.8 ± 1.8 | 39 |
| 4 | 9.4 | 1.00 | 63.0 ± 2.0 | 41.5 |
| 10 | 11 | 1.12 | 72.6 ± 10.5 | 42.8 |
| 13 | 13.0 | 1.26 | 53.1 ± 4.8 | 40.5 |
| 3 | 14.2 | 1.13 | 50.3 ± 1.2 | 40 |

Examples 18–22

Replacement of Long Chain Polyfluorinated Monomer with Various Monomers

A study was conducted in which the long chain polyfluorinated monomer, FX-13, was replaced on an equal weight basis (9.4 weight percent) in a composition of Example 4, Table 3 by shorter chain polyfluorinated monomers and other monomers, while maintaining the T1/DMA ratio at about 1. The results of this study are shown in Table 5, below, as to percent water on equilibrium hydration and $O_2$ permeability (Dk) value.

TABLE 5

Modified Base Lens Compositions

| Example Number | Monomer* | Water Content | $O_2$ Dk |
|---|---|---|---|
| 4 | FX-13 | 41.5 | 63.0 ± 2.0 |
| 18 | TEM | 43.2 | 47.4 ± 6.3 |
| 19 | DFHA | 41.0 | 51.3 ± 2.7 |
| 20 | MMA | 43.5 | 45.9 ± 2.0 |
| 21 | TBS | 40.0 | 50.3 ± 1.4 |
| 22 | PFS | 40.0 | 68.3 ± 2.9 |

TABLE 3

| | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|---|---|
| Reagent | | | | | | | | | | | | | | |
| V-64 | 0.1008 | 0.0997 | 0.0975 | 0.0988 | 0.0995 | 0.0970 | 0.1017 | 0.1024 | 0.1005 | 0.1052 | 0.0982 | 0.0968 | 0.1039 | 0.0974 |
| EGDMA | 0.1272 | 0.1374 | 0.1330 | 0.1398 | 0.1285 | 0.1280 | 0.1268 | 0.1359 | 0.1347 | 0.1354 | 0.1341 | 0.1367 | 0.1397 | 0.1373 |
| TMS | 0.3112 | 0.3188 | 0.3091 | 0.3139 | 0.3118 | 0.3165 | 0.3089 | 0.3120 | 0.3217 | 0.3145 | 0.3158 | 0.3166 | 0.3131 | 0.3165 |
| FX-13 | 0.9330 | 0.9476 | 1.3333 | 0.9456 | 1.5151 | 1.8027 | 1.1004 | 1.1132 | 1.6187 | 1.3154 | 1.7434 | 0.9214 | 0.9288 | 0.9364 |
| DMA | 4.2504 | 3.7750 | 3.7828 | 3.3027 | 3.3115 | 3.3099 | 3.9379 | 3.4590 | 3.4692 | 3.6200 | 3.3066 | 4.2468 | 3.3122 | 3.7713 |
| T1 | 4.2498 | 4.7141 | 4.2492 | 5.1804 | 4.7178 | 4.2494 | 4.4105 | 4.8777 | 4.4001 | 4.5560 | 4.2528 | 4.2450 | 5.1895 | 4.7311 |
| Total Mass | 9.9724 | 9.9926 | 9.9049 | 9.9812 | 10.0842 | 9.9035 | 9.9862 | 10.0002 | 10.0449 | 10.0465 | 9.8509 | 9.9633 | 9.9872 | 9.9900 |
| Parameter | | | | | | | | | | | | | | |
| Diam (mm) | 15.48 | 15.07 | 15.19 | 14.54 | 14.80 | 14.83 | 15.37 | 14.91 | 14.93 | 15.01 | 14.90 | 15.62 | 14.61 | 15.12 |
| CT (mm) | 0.098 | 0.094 | 0.098 | 0.093 | 0.096 | 0.094 | 0.097 | 0.096 | 0.097 | 0.092 | 0.096 | 0.099 | 0.095 | 0.095 |
| Power (D) | -2.60 | -2.71 | -2.59 | -3.16 | -3.03 | -2.91 | -2.72 | -3.00 | ND | -3.06 | -3.00 | -2.46 | ND | -2.75 |
| T1/DMA | 1.000 | 1.249 | 1.123 | 1.569 | 1.425 | 1.284 | 1.120 | 1.410 | 1.268 | 1.259 | 1.286 | 1.000 | 1.567 | 1.255 |
| T1/FX-13 | 4.555 | 4.975 | 3.187 | 5.478 | 3.114 | 2.357 | 4.008 | 4.382 | 2.718 | 3.464 | 2.439 | 4.607 | 5.587 | 5.052 |
| DMA/FX-13 | 4.556 | 3.984 | 2.837 | 3.493 | 2.186 | 1.836 | 3.579 | 3.107 | 2.143 | 2.752 | 1.897 | 4.609 | 3.566 | 4.027 |
| % Water | 41.5 | 39.5 | 42.0 | 36.2 | 39.0 | 40.5 | 42.8 | 38.8 | 40.2 | 40.5 | 40.5 | 45.0 | 36.5 | 40.6 |
| Oxygen Dk | 63.0 | ND | ND | ND | ND | ND | 72.6 | ND | ND | 53.1 | ND | ND | ND | ND |

ND = Not determined

TABLE 5-continued

Modified Base Lens Compositions

| Example Number | Monomer* | Water Content | O₂ Dk |
|---|---|---|---|

*TEM = Trifluoroethyl methacrylate, DFHA = Dodecafluoroheptyl acrylate, MMA = Methyl methacrylate, TBS = t-Butylstyrene, PFS = Pentafluorostyrene.

As is seen from the data, use of each of the monomers provided similar water contents. The use of the fluorinated monomers, particularly those with 5 to 20 fluorine atoms per monomer molecule, exhibited the highest Dk values.

Examples 23–25

Addition of Cationic Monomer with Varying T1:DMA Ratio and Long Chain Polyfluorinated Monomer A study was conducted to assess the effect of the addition of a cationic monomer into a lens formulation that also contained varying amounts of the long chain fluorinated monomer, FX-13, while decreasing the relative amount of the T1/DMA ratio. The formulations for these compositions and their water contents and $O_2$ permeabilities are shown in Table 6, below.

TABLE 6

Cationic-Monomer Modified Lenses

| Reagents | Example 23 (Mass gm) | Example 24 (Mass gm) | Example 25 (Mass gm) |
|---|---|---|---|
| V-64 | 0.1212 | 0.1185 | 0.0989 |
| EGDMA | 0.1490 | 0.1475 | 0.1327 |
| TMS | 0.3776 | 0.3742 | 0.3204 |
| MEM | 0.6037 | 0.5964 | 0.4650 |
| DMA | 4.5498 | 4.5592 | 4.0078 |
| T1 | 6.8981 | 5.1711 | 4.0111 |
| FX-13 | 0 | 1.7334 | 0.9353 |
| Total Mass (solids) | 12.6994 | 12.7007 | 9.9712 |
| % FX-13 | zero | 13.6 | 9.4 |
| T1/DMA | 1.52 | 1.13 | 1.0 |
| % MEM | 4.8 | 4.7 | 4.7 |
| % Water | 39.0 | 39.0 | 43.0 |
| Oxygen Dk | 60.6 ± 6.7 | 47.0 ± 2.1 | 76.6 ± 3.2 |

Examples 26–31

Effect of T1:DMA Ratio on Base Lens Formulations

A study was conducted to examine the effect of the ratio of T1 monomer to DMA monomer in the absence of a polyfluorinated monomer as in the "base" formulation of Table 2. The lens formulations are shown in Table 7, below, wherein "Ex." means Example. The effects of altering that ratio on oxygen permeability and water content are shown in Table 8, thereafter.

TABLE 7

Comparative Base Lens Formulations

| Reagent | Ex. 26 | Ex. 27 | Ex. 28 | Ex. 29 | Ex. 30 | Ex. 31 |
|---|---|---|---|---|---|---|
| V-64 | 0.0987 | 0.0985 | 0.1003 | 0.0993 | 0.0995 | 0.1038 |
| EGDMA | 0.1366 | 0.1361 | 0.1323 | 0.1333 | 0.1350 | 0.1328 |
| TMS | 0.3202 | 0.3246 | 0.3124 | 0.3162 | 0.3127 | 0.3132 |
| DMA | 5.0056 | 5.2512 | 5.5018 | 4.0157 | 4.2523 | 4.7559 |
| T1 | 4.4994 | 4.2528 | 4.0016 | 5.5057 | 5.2516 | 4.7558 |
| T1:DMA | 0.9 | 0.8 | 0.7 | 1.4 | 1.2 | 1.0 |

TABLE 8

Effect of T1:DMA Ratio On Modified Base Lens O₂ Permeability And Percent Water Content

| T1:DMA | O₂ Permeability (Dk) | % H₂O Content |
|---|---|---|
| 1.4 | 55.9 ± 13.4 | 38 |
| 1.2 | 52.8 ± 4.6 | 40 |
| 1.0 | 55.5 ± 10.7 | 45 |
| 0.9 | 39.0 ± 2.0 | 47 |
| 0.8 | 39.5 ± 3.0 | 48 |
| 0.7 | 36.7 ± 4.4 | 51 |

The above data indicate that as the T1:DMA ratio changes between 1.4 to 1.0, the Dk value stays high and relatively constant, whereas that value drops off sharply below a T1:DMA ratio of about 1.0. A slowly rising water content was observed with a decrease in the T1/DMA ratio in the examined range.

Examples 32 and 33

Aromatic Replacement of TMS in the Example 4 Lens

A study was conducted in which 2,4,6-trimethylstyrene (TMS) of Example 4, Table 3, was replaced on an equal weight basis with the hydrophobic aromatic, styrene-type monomers 4-t-butylstyrene or styrene in a lens co-polymer formulation that contained a T1:DMA weight ratio of about 1 and about 9 to about 10 weight percent long chain polyfluorinated monomer. The formulations for those lenses and their water contents and oxygen permeabilities are shown in Table 9, below. As will be seen, each of the lenses so prepared exhibited excellent properties.

TABLE 9

Aromatic-Modified FX-13 Lenses

| Reagent | Example 4 (Mass gm) | Example 32 (Mass gm) | Example 33 (Mass gm) |
|---|---|---|---|
| V-64 | 0.1008 | 0.1006 | 0.0981 |
| EGDMA | 0.1272 | 0.1340 | 0.1296 |
| TMS | 0.3112 | — | — |
| Styrene | — | — | 0.3124 |
| TES | — | 0.3178 | — |
| DMA | 4.2504 | 4.2446 | 4.2531 |
| T1 | 4.2498 | 4.2416 | 4.2519 |
| FX-13 | 0.9330 | 0.9525 | 0.9522 |
| Total Mass (solids) | 9.9724 | 9.9911 | 9.9973 |
| T1/DMA | 1.0 | 1.0 | 1.0 |

TABLE 9-continued

Aromatic-Modified FX-13 Lenses

| Reagent | Example 4 (Mass gm) | Example 32 (Mass gm) | Example 33 (Mass gm) |
|---|---|---|---|
| % Water | 41.5 | 46.0 | 44.5 |
| Oxygen Dk | 63.0 ± 2.0 | 66.9 ± 4.4 | 77.0 ± 7.1 |

Example 34
Protein Deposition on Aromatic-modified Lenses

Additional lenses were prepared using styrene in place of trimethylstyrene (TMS) in the formulation of Example 4, in which FX-13 was present at about 9.4 percent and the T1:DMA ratio was about 1. The formulation used is illustrated below in Table 10, and is referred to elsewhere as "S-base". A formulation was also prepared that contained about the same amount of styrene, as well as about 3.6 weight percent MD9 monomer as a replacement for an equal amount of DMA, that is referred to as MD9-S-base.

TABLE 10

| | Weight Percentage | |
|---|---|---|
| Monomer | S-base Example 34 | MD9-S-base Example 35 |
| V-64 | 1.0 | 0.9 |
| EGDMA | 1.3 | 1.4 |
| Styrene | 3.1 | 3.3 |
| FX-13 | 9.3 | 9.4 |
| DMA | 42.7 | 34.0 |
| T1 | 42.6 | 47.5 |
| MD9 | 0.0 | 3.6 |
| | 100% | 100% |

Lenses so prepared and commercially available lenses were soaked in 0.46 g/L lysozyme solution and analyzed using infrared spectroscopy to determine the amount of protein adsorbed onto a lens. The amide II bands were measured and converted to protein concentration by a calibration curve. The assay procedures discussed previously, and results of these studies are discussed and shown below.

The protein concentrations are as follows:

| | S-Base Formulation µg/cm2 protein* | | | MD9-S-Base Formulation µg/cm2 protein* | | |
|---|---|---|---|---|---|---|
| | Day 1 | Day 3 | Day 7 | Day 1 | Day 3 | Day 7 |
| Average | 0.734 | 0.670 | 0.400 | 0.134 | 0.529 | 0.292 |
| Std. Dev. | 0.974 | 0.593 | 0.438 | 0.300 | 0.535 | 0.289 |

*N = *3

| | µg/cm2 protein | | | |
|---|---|---|---|---|
| | DS2* Day 1 | DS3* Day 1 | Gentle Touch Day 1 | CSI/ Clarity Day 1 |
| Average | 0.377 | 7.813 | 0.200 | 0.372 |
| Std.Dev. | 0.756 | 0.082 | 0.100 | — |

*N = 3; DS2 = DuraSoft ™ 2 commercially available lens;
DS3 = DuraSoft ™ 3 commercially available lens.

The S-base and MD9-S-base lenses seemed to adsorb about as much lysozyme as the CSI/Clarity™, DS2 or GentleTouch™ lenses, within the standard deviation of the measurement. They adsorbed a significantly less amount of protein than DS3 lenses.

The procedure described before utilizes attenuated total reflectance (ATR) and provides an in vitro method for estimating the amount of protein deposited onto each contact lens.

Example 35

Mucin and Lysozyme Deposition Study

A study was carried out to measure the amount of both mucin and lysozyme deposited upon the base lens of Example 0, Table 2, the cationic monomer-containing lens of Example 25, Table 6, and a commercially available daily wear lens (FreshLook™ lens). The procedures for carrying out that study are the same as those discussed in the previous Example, except that mucin (Sigma Chemical Co., St Louis, Mo.) is used in place of lysozyme in the appropriate studies. The results of that study are shown in Table 11.

TABLE 11

Mucin and Lysozyme Deposition Results for Base,
Cationic-Modified FX-13 Base and Commercial Lenses

| Lens Type* | Mucin [µg/cm$^2$] | Lysozyme [µg/cm$^2$] |
|---|---|---|
| Base Lens | 0.33 ± 0.11 | 1.49 ± 0.11 |
| Cationic-Modified | 1.73 ± 0.54 | 1.88 ± 0.56 |
| FreshLook ™ | 1.96 ± 0.61 | 7.81 ± 0.08 |

*Base lens is that of Table 2, Example 0; Cationic-modified is the lens of Example 25, Table 6.

From these preliminary data it appears that mucin binds to the base lens at a very low level (comparable to lysozyme binding to a CSI Lens), and that mucin binds about 5.3 times more to the cationic modified base lens versus the base lens itself.

Therefore, the cationic-modified base lens does not exhibit corneal adhesion by binding the mucin, which makes up the base layer of the tear film. This mucin layer can improve ocular movement and on eye wettability.

Example 36

Co-polymerized Silicone Monomer Incorporation in Styrene-containing Lenses

Several silicone and siloxanyl (siloxy-containing) monomers were examined for use in lenses. A chart and corresponding structure for these monomers was shown previously.

Silicone methacrylates were added (1–35 weight percent) to the styrene-containing base formulation (shown in Table 12, below) and polymerized using Procedure C.

TABLE 12

| Component | Weight % Added |
|---|---|
| Styrene | 3.18 |
| FX-13 | 9.51 |
| DMA | 42.77 |
| T1 | 42.78 |
| EDGMA | 1.04 |
| V-64 | 0.72 |
| | 100 |

Results:

A. Silicone Incorporations

The M2D65 was soluble only to about 1 percent, limiting the range for this monomer mixture. The M2K2 and M2D2 lenses made clear, albeit non-compliant (i.e. RGP-like stiffness) lenses, especially at high loading levels. MD9 exhibited high solubility and made clear lenses, even at 38 weight percent loading. Typical silicone monomer contents were about 1 to about 6 weight percent.

The hypothesis here was that incorporating more silicone into the lens would increase the Dk. However, the results with these M2-type bis(methacrylate) silicone monomers showed the reverse trend. Addition of any bis(methacrylate) silicone monomer to the base formulation showed a decrease in Dk. This unexpected result caused additional formulations to be made to determine which factor, if any, would increase Dk.

B: MD9/T1/DMA Formulations

Initial mixture studies were done by mixing various concentrations of MD9, T1, and DMA, but MD9 was found to be insoluble at several concentrations. A phase diagram (FIG. 4) was used to ensure subsequent formulations provided clear contact lenses.

Figure 2:
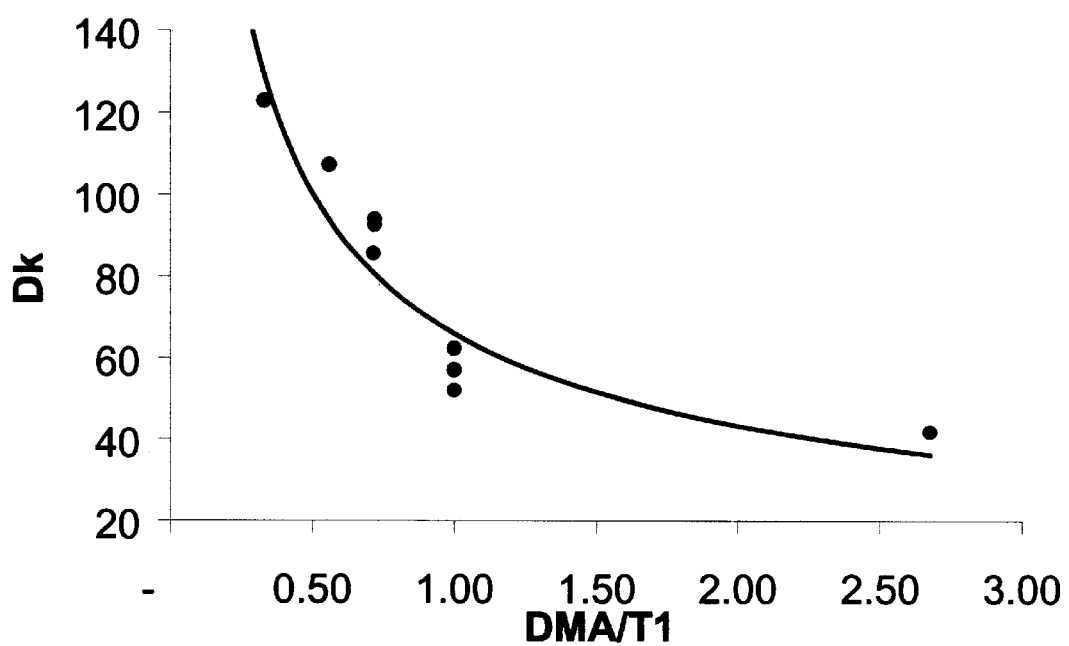
FIG. 2 is a graph of oxygen permeability values (Dk units) versus DMA:T1 (dimethylacrylamide: T1) content of contact lenses for lenses containing 3.5 weight percent MD9 (a monomethacryloxypropyl-terminated polydimethylsiloxane having a molecular weight of about 1000), as well as two lenses containing 7 and 56 weight percent MD9 and having a DMA:T1 [T1, also sometimes referred to as TRIS, is methacryloxypropyltris(trimethylsiloxy)silane] ratio of 1.
Figure 3:
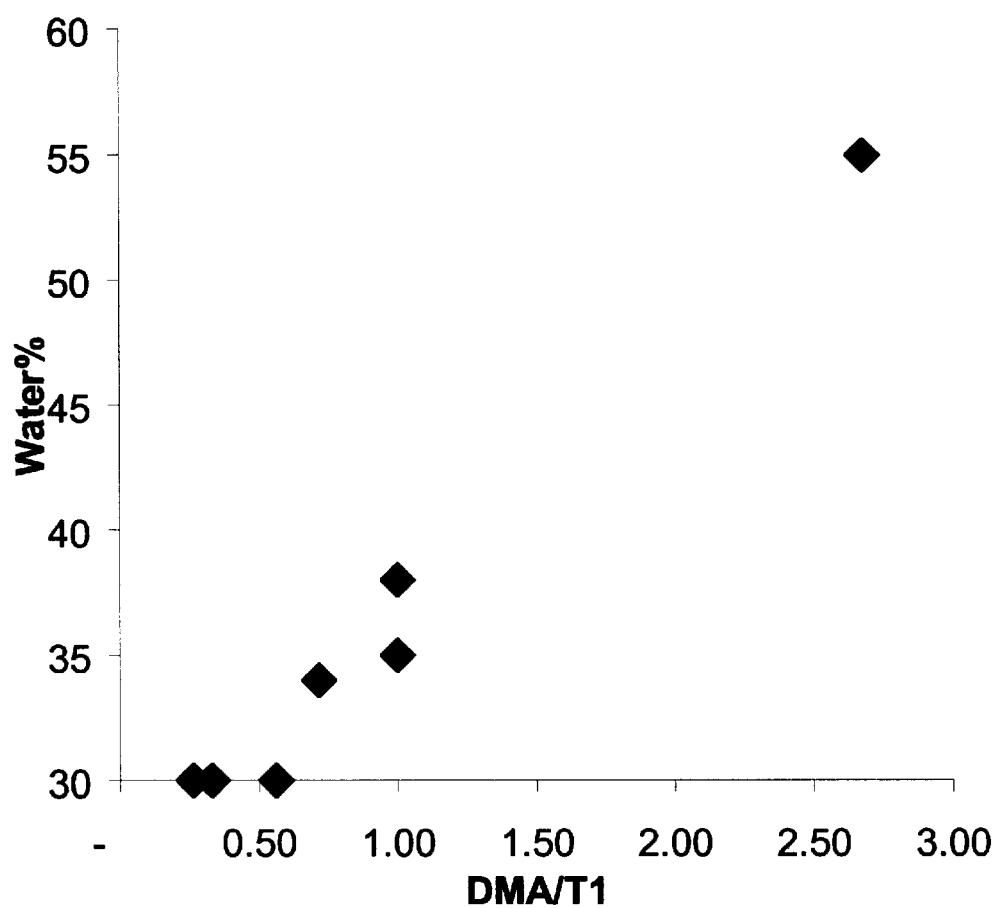
FIG. 3 is a graph of water content as weight percent versus DMA:T1 content for the lenses of FIG. 2, and in which water contents below about 30 weight percent are estimated.

Because MD9, a poly(dimethylsiloxy)silyl methacrylate, did not appear to increase Dk, the phase diagram (FIG. 4) was consulted and subsequent studies were planned to adjust the DMA:T1 ratio at a constant level of MD9 (about 3.5%). Increasing the DMA:T1 ratio in prior formulations showed either an increased Dk, a slight decrease in Dk, or no effect in Dk. In this case, addition of the MD9 showed that Dk could be influenced by adjusting the DMA:T1 ratio (see FIG. 2). However, decreasing the DMA:T1 ratio reduced the water content of the lenses (see FIG. 3).

Addition of this small amount of MD9 improved the Dk of these hydrogels. The maximum Dk observed was 123 Dk units at a DMA:T1 ratio of 0.33 (or T1:DMA ratio of 3). At this level, there was difficulty in removing the lenses from the molds because of high adhesion forces. The lenses appeared to have strong cohesion forces, causing folded lenses to stick together. The water content of these lenses was low (<30 percent), indicating that these lenses might have corneal adhesion problems.

A compromise of high Dk and water content was found with a DMA:Tl ratio of 0.72 (or T1:DMA ratio of 1.39), where an average Dk value of 90 Dk units was observed. The water content was found to be about 30 percent water for this formulation.

The reason that the MD9 level is able to augment the oxygen permeability of these gels is still unknown. Possibly, the MD9 could be acting as a coalescing site for the T1 monomer without affecting the oxygen transport capability of the T1 monomer. The MD9 monomer could be disrupting the organization of the hydrogel, permitting oxygen to better pass through the amorphous regions. This could permit a more continuous oxygen-transporting phase through the gel.

C: Replacing T1 with Low Molecular Weight Methacrylsilicones

Another series of studies was performed to see if methacrylsilicones could be used to replace the T1 monomer. The MD5, MD3, and VD2 were soluble in DMA without any change of miscibility seen with MD9 or the higher molecular weight methacrylsilicones. All VD2 polymers were opaque, probably because the vinyl groups are less reactive than the methacryl monomers. VD2 can still be used as a substitute for T1 if the polymerization were done under nitrogen. Replacing the T1 with MD5 and MD3 made clear contact lenses; however, the Dk values of these lenses were small.

The T1 seems more efficient in transporting oxygen than the short methacrylsilicone monomers. The tri(siloxy)silyl group from the T1 monomer has a larger free volume and more conformational freedom than the dimethylsiloxy group from the methacrylsilicones. Other monomers can be used in place of T1, such as vinyl-tris(trimethylsiloxy) silane, vinyl-tris(dimethysiloxy)silane, allyl tris(trimethylsiloxy)silane, or (3-acryloxypropyl) tris(trimethylsiloxy)silane.

Example 37

Effect of Altered Initiator (V-64) and Cross-linker (EGDMA) Concentrations in Styrene-containing Lenses As a control, the S-base formulation of Table 12 was studied with various concentrations of initiator and cross-linker. The formulations are given in Table 13, below.

TABLE 13

| | Low weight | Center weight | High weight |
|---|---|---|---|
| V-64 | 0.76% | 1.01% | 1.27% |
| EGDMA | 1.05% | 1.40% | 1.75% |

| Weight Percent Used: | |
|---|---|
| Styrene | 3.23 |
| FX-13 | 9.68 |
| DMA | 43.54 |
| T1 | 43.55 |
| | 100 |

Dk=74.71±8.44 Dk
Diameter=16.27±0.16 mm
Center thickness=102±3 mm

Produced lenses were all clear, but some showed warpage, surface defects, and edge defects. Most showed a good deal of flash, possibly indicating a better evacuation is needed or less monomer should be used. Particulate was observed, possibly indicating that a clean room environment or monomer filtration might be needed for final evaluation.

Curling seemed to be related to initiator concentration; reduced initiator seemed to reduce the number of curled lenses (p=0.1). Dk, thickness, and diameter might possibly have a 2-way interaction between cross-linker and initiator, but this connection could not be proved significantly with this small study. However, these data showed that the styrene-modified base (S-base) formulation is robust and could be trusted as a control to compare subsequent lenses.

Example 38

Lens Preparations

A series of ophthalmic lenses was prepared using production facilities normally utilized in the manufacture of other contact lenses. The two formulations utilized in this study are shown in Table 14, below, wherein previously used abbreviations have the same meanings.

TABLE 14

| | Weight Percent | |
|---|---|---|
| Component | S-Modified Base Example 36 | MEM-Modified Base Example 37 |
| V-64 | 0.9 | 0.8 |
| EDMA | 1.1 | 1.1 |
| Styrene | 2.7 | Zero |
| TMS | Zero | 2.7 |
| FX-13 | 8.0 | 8.0 |
| DMA | 36.2 | 34.2 |
| T1 | 36.2 | 34.2 |
| MEM | Zero | 4.0 |
| EtOH | 15.0 | 15.0 |
| % Water | 45 | 43 |
| Oxygen Dk | 77 | 77 |

About 50 percent of the S-base lenses inspected were acceptable. Most of the defects were flash or edge defects. The lenses made using specially designed casting cups were within tolerance, except for a slightly flat base curve. On the other hand, only about 7 percent of the MEM-base lenses inspected were acceptable. This probably indicates that the corona level was too high, causing the lenses to adhere strongly to the base curve of the casting cups and tear during mold opening or delensing. Both types of lens were cured under nitrogen for about three hours at around 90° C. in an oven, and then inspected.

Example 39

Lens Preparation Using Aliphatic Hydrophobic Monomers in Place of Aromatic Hydrophobic Monomers Another series of ophthalmic lenses was prepared using Procedure C in which the usually present hydrophobic aromatic monomer was replaced on an equal weight basis by an aliphatic hydrophobic monomer. The two formulations utilized in this study are shown in Table 15, below, wherein previously used abbreviations have the same meanings.

TABLE 15

| | Weight Added | |
|---|---|---|
| Component | MMA-Modified Base Example 38 | OMA-Modified Base Example 39 |
| V-64 | 0.1013 | 0.0925 |
| EDMA | 0.1345 | 0.1371 |
| MMA* | 0.3095 | Zero |
| OMA* | Zero | 0.3103 |
| FX-13 | 0.9318 | 0.9557 |
| DMA | 4.2482 | 4.2484 |
| T1 | 4.2498 | 4.2522 |
| % Water | 46.0 | 44.0 |
| Oxygen Dk | 88.2 ± 14.3 | 80.9 ± 18.6 |

*MMA = methyl methacrylate and OMA = octyl methacrylate.

As can be seen from the data above, the replacement of the aromatic hydrophobic monomer by an aliphatic hydrophobic monomer in the reaction mixture provided lenses that exhibited both enhanced water contents and enhanced oxygen Dk values. Indeed, Dk values for several samples were well into the 90's as is evidenced by the standard deviations.

Example 40

Lens Preparation Using Monohydric Alcohol Solvents

A series of lenses was prepared from similar compositions that contained a monohydric alcohol as solvent. All of the lenses contained MD9 at about 1 percent of the polymerizable monomers. One pair differed only in containing about 15 weight percent ethanol versus no solvent, whereas the third group of lenses additionally contained the cationic monomer, MEM. The lenses were polymerized as before, and were cured in an oven at about 90° C. under nitrogen gas for about 3 hours after polymerization to remove the solvent. The compositions of those lenses are shown below in Table 16.

TABLE 16

| | Weight Added | | |
|---|---|---|---|
| Component | MD9-Modified S-Base | MD9-Modified S-Base + Alcohol | MEM/MD9-Modified S-Base + Alcohol |
| V-64 | 0.0085 | 0.0072 | 0.0078 |
| EDMA | 0.0138 | 0.0117 | 0.0115 |
| MEM | Zero | Zero | 0.0396 |
| MD9 | 0.0356 | 0.0303 | 0.0303 |
| FX-13 | 0.0939 | 0.0798 | 0.0798 |
| DMA | 0.3399 | 0.2889 | 0.2723 |
| T1 | 0.4748 | 0.4036 | 0.3803 |
| Styrene | 0.0334 | 0.0284 | 0.0284 |
| Ethanol | Zero | 0.1500 | 0.1500 |
| T1/DMA | 1.4 | 1.4 | 1.4 |
| % Water | 43 | 41 | 41 |
| Oxygen Dk | 111 ± 7.5 | 131 ± 7.2 | 79.4 ± 5.4 |

Two further sets of lenses were prepared using isopropanol as solvent. These lenses were variants of the lenses of formula Example 4 (Ex. 4). Lens preparation was as above. The compositions of these lenses are shown in Table 17, below.

TABLE 17

| Component | Modified Ex. 4 + Alcohol | Modified Ex. 4 + Alcohol |
|---|---|---|
| V-64 | 0.0086 | 0.0086 |
| EDMA | 0.0108 | 0.0108 |
| FX-13 | 0.0795 | 0.0795 |
| DMA | 0.3689 | 0.3722 |
| T1 | 0.3689 | 0.3722 |
| TMS | 0.0133 | 0.0066 |
| Isopropanol | 0.1500 | 0.1500 |
| % Water | 52 | 53 |

Each of the patents and articles cited herein is incorporated by reference. The use of the article "a" or "an" is intended to include one or more.

Example 41

Cationic Monomer-containing Lenses

Lenses were prepared to contain about 21 or about 42 weight percent DMAEM. The lenses were prepared using the formulations shown in Table 18. Usual curing at 120° C. for ten minutes was inadequate to obtain a full cure, although a cure time of fifteen minutes provided a good cure for the 21 percent DMAEM lenses. Even forty minutes of cure time did not work for the 42 percent DMAEM lenses, and no more was done with those lenses. The lenses containing about 21 percent DMAEM (Example 40) were found to contain 48.0% water after hydration and exhibited oxygen permeability values of 61.0±1.2 Dk units.

TABLE 18

| Monomer | Weight Percentage | |
|---|---|---|
| | 21 Percent Example 40 | 42 Percent Example 41 |
| V-64 | 1.0 | 1.0 |
| EGDMA | 1.4 | 1.4 |
| iso-propyl MA | 3.2 | 3.2 |
| FX-13 | 9.4 | 9.4 |
| DMA | 21.3 | Zero |
| T1 | 42.5 | 42.5 |
| DMAEM | 21.3 | 42.5 |

Lysozyme and mucin binding studies were carried out as discussed previously. Results of those studies indicated that the Example 40 lenses exhibited low lysozyme binding (2.5±1.2 $\mu g/cm^2$) and low mucin binding (1.4+0.7 $\mu g/cm^2$). The mucin binding results were particularly surprising because the 5 percent MEM lenses of Example 25 (Table 11) were found to bind about 1.73±0.54 $\mu g/cm^2$. If electrostatic attraction were linear, one would predict about 7.8 $\mu g/cm^2$ would bind to the Example 40 lenses.

Measurement of static, advancing contact angles by wetting the lens surface with a drop of water, removing the water and placing a smaller drop on the pre-wetted area and the measuring the contact angle of the last-added drop (1 $\mu$L) was also carried out on the lenses of Examples 25 and 40. The results indicated a statistically significant improvement in wettability (96.5° vs. 84.5°, respectively). The surface of the Example 40 lens also appeared to become more wettable each time water was placed on its surface and then removed, with the contact angle changing from about 89° to about 82°.

Studies were also carried out using about 15 to about 20 weight percent DMAEM and changing the ratio of monomers T1 and DMA. A formulation for some of those lenses are shown as Example 42 in Table 19, below, along with the observed water percentage and oxygen permeability values of the produced lenses.

TABLE 19

| | Example 42 |
|---|---|
| Monomer | T1:DMA = 2.8 Weight Percent |
| V-64 | 1.0 |
| EGDMA | 1.3 |
| isopropyl MA | 3.2 |
| PFS | 9.3 |
| FX-13 | — |
| DMA | 17.7 |
| T1 | 49.6 |
| DMAEM | 17.8 |
| % Water | <32 |
| Oxygen Dk | 117.3 ± 12.2 |

Example 42

Lenses With Alternative Fluorine-containing Monomers

A series of lenses was prepared containing fluorine-containing monomers other than the preferred FX-13. Compositions and properties of some of those lenses are shown below in Table 20.

TABLE 20

| | Weight Percentage | |
|---|---|---|
| Monomer | Example 43 | Example 44 |
| V-64 | 0.8 | 0.8 |
| EGDMA | 1.4 | 1.4 |
| Styrene | 3.3 | 3.3 |
| PFS | — | 9.4 |
| HFIPMA | 9.4 | — |
| DMA | 34.0 | 34.0 |
| T1 | 47.5 | 47.5 |
| MD9 | 3.6 | 3.6 |
| % Water | 45.0 | 35 |
| Oxygen Dk | 100.3 ± 6.8 | 87.7 ± 5.3 |

Each of the patents and articles cited herein is incorporated by reference. The use of the article "a" or "an" is intended to include one or more.

From the foregoing, it will be observed that numerous modifications and variations can be effectuated without departing from the true spirit and scope of the novel concepts of the present invention. It is to be understood that no limitation with respect to the specific examples presented is intended or should be inferred. The disclosure is intended to cover by the appended claims all such modifications as fall within the scope of the claims.

What is claimed is:

1. An ophthalmic lens comprising a polymeric material that has an oxygen permeability of about 45 to about 150 Dk units and a hydrated water content of about 20 to about 55 weight percent, the polymeric material being comprised of a co-polymer of:
   (a) a hydrophilic monomer;
   (b) a hydrophobic aromatic or aliphatic monomer or a mixture thereof in an amount effective to provide said copolymer with an increased oxygen permeability;
   (c) a tris(siloxy)silyl group-containing monomer;
   (d) a fluorinated monomer containing about 3 to about 20 fluorine atoms and 4 to about 20 carbon atoms per monomer molecule, in an amount effective to provide said copolymer with an increased water content at equilibrium hydration; and
   (e) an amount of cross-linker sufficient to provide a stress at break value of about 0.003 to about 30 $N/mm^2$, elongation at break of about 25 to about 3000 percent and a modulus value of about 0.001 to about 10 $N/mm^2$.

2. The ophthalmic lens according to claim 1 wherein said hydrophilic monomer is a non-ionic hydrophilic monomer containing a methacrylamide, an acrylamide, a methacrylate ester or an acrylate ester group.

3. The ophthalmic lens according to claim 1 wherein said hydrophobic aromatic monomer is a styrene-containing monomer.

4. The ophthalmic lens according to claim 1 wherein said hydrophobic aliphatic monomer is a $C_1$–$C_{10}$ aliphatic ester of acrylic acid or methacrylic acid.

5. The ophthalmic lens according to claim 1 wherein said tris(siloxy)silyl group-containing monomer is a tris (trimethylsiloxy)silyl group-containing amide or ester of acrylic acid or methacrylic acid.

6. The ophthalmic lens according to claim 1 wherein said fluorinated monomer containing about 3 to about 20 fluorine atoms per monomer molecule is an amide or ester of acrylic acid or methacrylic acid.

7. An ophthalmic lens comprising a polymeric material that has an oxygen permeability of about 45 to about 150 Dk units and a hydrated water content of about 20 to about 55 weight percent, the polymeric material being comprised of a co-polymer of (a) a hydrophilic monomer, (b) a hydrophobic aromatic or aliphatic monomer or a mixture thereof, (c) a tris(siloxy)silyl group-containing monomer, (d) a fluorinated monomer containing about 3 to about 20 fluorine atoms and 4 to about 20 carbon atoms per monomer molecule that is a suffonamido ethyl ester of acrylic acid or methacrylic acid, and (e) an amount of cross-linker sufficient to provide a stress at break value of about 0.003 to about 30 $N/mm^2$, elongation at break of about 25 to about 3000 percent and a modulus value of about 0.001 to about 10 $N/mm^2$.

8. An ophthalmic lens of claim 2, wherein said hydrophobic aromatic monomer is a hydrophobic styrene-containing monomer, wherein said hydrophobic aliphatic monomer is a $C_1$–$C_{10}$ aliphatic ester of acrylic acid or methacrylic acid, wherein said tris(siloxy)silyl group-containing monomer is an amide or ester of acrylic acid or methacrylic acid, and wherein said fluorinated monomer containing about 3 to about 20 fluorine atoms and 4 to about 20 carbon atoms per monomer molecule is an amide or ester of acrylic acid or methacrylic acid.

9. An ophthalmic lens of claim 7, wherein said hydrophilic monomer contains a methacrylamide, an acrylamide, a methacrylate ester or an acrylate ester group, wherein said hydrophobic aromatic monomer is a hydrophobic styrene-containing monomer, wherein said hydrophobic aliphatic monomer is a $C_1$–$C_{10}$ aliphatic ester of acrylic acid or methacrylic acid, wherein said tris(siloxy)silyl group-containing monomer is an amide or ester of acrylic acid or methacrylic acid, wherein said fluorinated monomer containing about 3 to about 20 fluorine atoms and 4 to about 20 carbon atoms per monomer molecule is a sulfonamido ethyl ester of acrylic acid or methacrylic acid.

10. The ophthalmic lens according to claim 8 wherein (a) said non-ionic hydrophilic monomer is present at about 30 to about 60 weight percent, (b) said hydrophobic monomer is present at about 2.5 to about 4.5 weight percent, (c) said tris(siloxy)silyl group-containing monomer is present at about 30 to about 65 weight percent, and (d) said fluorinated monomer is present up to about 20 weight percent.

11. The ophthalmic lens according to claim 8 wherein the weight ratio of the tris(siloxy)silyl group-containing monomer to the non-ionic hydrophilic monomer is about 0.3:1 to about 2:1.

12. A polymeric contact lens comprising a co-polymer that is co-polymerization product of (a) a non-ionic hydrophilic monomer, (b) a hydrophobic aromatic monomer in an amount effective to provide said co-polymer with an increased oxygen permeability, (c) a tris(siloxy)silyl group-containing monomer, (d) a fluorinated monomer containing about 3 to about 20 fluorine atoms and 4 to about 20 carbon atoms per monomer molecule in an amount effective to provide said co-polymer with an increased water content at equilibrium hydration and (e) a cross-linking agent, wherein the weight ratio of the tris(siloxy)silyl group-containing monomer to the non-ionic hydrophilic monomer is about 0.3:1 to about 2:1, said lens having an oxygen permeability of greater than about 60 Dk units and a water content at equilibrium hydration of about 35 to about 55 weight percent.

13. The contact lens according to claim 12 wherein said hydrophilic monomer is a non-ionic hydrophilic monomer containing a methacrylamide, an acrylamide, a methacrylate ester or an acrylate ester group.

14. The contact lens according to claim 12 wherein said hydrophobic aromatic monomer is a styrene-containing monomer.

15. The contact lens according to claim 12 wherein said tris(siloxy)silyl group-containing monomer is a tris(trimethylsiloxy)silyl group-containing amide or ester of acrylic acid or methacrylic acid.

16. The contact lens according to claim 12 wherein said fluorinated monomer containing about 3 to about 20 fluorine atoms per monomer molecule is an amide or ester of acrylic acid or methacrylic acid.

17. A contact lens comprising a co-polymer that is co-polymerization product of (a) a non-ionic hydrophilic monomer, (b) a hydrophobic aromatic monomer, (c) a tris(siloxy)silyl group-containing monomer, (d) a fluorinated monomer containing about 3 to about 20 fluorine atoms and 4 to about 20 carbon atoms per monomer molecule which is a sulfonamido ethyl ester of acrylic acid or methacrylic acid and (e) a cross-linking agent, wherein the weight ratio of the tris(siloxy)silyl group-containing monomer to the non-ionic hydrophilic monomer is about 0.3:1 to about 2:1, said lens having an oxygen permeability of greater than about 60 Ok units and a water content at equilibrium hydration of about 35 to about 55 weight percent.

18. The contact lens according to claim 12 wherein the weight ratio of the tris(siloxy)silyl group-containing monomer to the non-ionic hydrophilic monomer is about 0.6:1 to about 2:1.

19. A polymeric contact lens of claim 18, wherein said non-ionic hydrophilic monomer is a hydrophilic monomer containing a methacrylamide, an acrylamide, a methacrylate ester or an acrylate ester group, wherein said hydrophobic aromatic monomer is a hydrophobic styrene-containing monomer, wherein said tris(siloxy)silyl group-containing monomer is an amide or ester of acrylic acid or methacrylic acid, wherein said fluorinated monomer containing about 3 to about 20 fluorine atoms and 4 to about 20 carbon atoms per monomer molecule is an amide or ester of acrylic acid or methacrylic acid.

20. The contact lens according to claim 17, wherein said non-ionic hydrophilic monomer is a hydrophilic monomer containing a methacrylamide, an acrylamide, a methacrylate ester or an acrylate ester group, wherein said hydrophobic aromatic monomer is a hydrophobic styrene-containing monomer, wherein said tris(siloxy)silyl group-containing monomer is an amide or ester of acrylic acid or methacrylic acid, and wherein the weight ratio of the tris(siloxy)silyl group-containing monomer to the non-ionic hydrophilic monomer is about 0.6:1 to about 2:1.

21. The contact lens according to claim 19 wherein (a) said non-ionic hydrophilic monomer is present at about 30 to about 60 weight percent, (b) said hydrophobic styrene-containing monomer is present at about 2.5 to about 4.5 weight percent, (c) said tris(siloxy)silyl group-containing monomer is present at about 30 to about 65 weight percent, and (d) said fluorinated monomer is present up to about 20 weight percent.

22. A polymeric contact lens of claim 12, wherein said non-ionic hydrophilic monomer is a non-ionic hydrophilic monomer containing a methacrylamide, an acrylamide, a methacrylate ester or an acrylate ester group.

23. The contact lens according to claim 22 wherein said hydrophobic aromatic monomer is a styrene-containing monomer.

24. The contact lens according to claim 22 wherein said tris(siloxy)silyl group-containing monomer is a tris(trimethylsiloxy)silyl group-containing amide or ester of acrylic acid or methacrylic acid.

25. The contact lens according to claim 22 wherein said fluorinated monomer containing about 3 to about 20 fluorine atoms per monomer molecule is an amide or ester of acrylic acid or methacrylic acid.

26. The contact lens according to claim 17, wherein said non-ionic hydrophilic monomer is a non-ionic hydrophilic monomer containing a methacrylamide, an acrylamide, a methacrylate ester or an acrylate ester group.

27. The contact lens according to claim 22 wherein the weight ratio of the tris(siloxy)silyl group-containing monomer to the non-ionic hydrophilic monomer is about 0.7:1 to about 1.4:1.

28. A polymeric contact lens comprising a co-polymer that is co-polymerization product of (a) a non-ionic hydrophilic monomer containing a methacrylamide, an acrylamide, a methacrylate ester or an acrylate ester group, (b) a hydrophobic styrene-containing monomer, (c) a tris(siloxy)silyl group-containing monomer that is an amide or ester of acrylic acid or methacrylic acid, (d) a fluorinated monomer containing about 3 to about 20 fluorine atoms and 4 to about 20 carbon atoms per monomer molecule that is a sulfonamido ethyl ester of acrylic acid or methacrylic acid and (e) a cross-linking agent, wherein the weight ratio of the tris(siloxy)silyl group-containing monomer to the non-ionic hydrophilic monomer is about 0.7:1 to about 1.4:1, said lens having an oxygen permeability of greater than about 50 Dk units and a water content at equilibrium hydration of about 35 to about 55 weight percent.

29. The contact lens according to claim 28 wherein (a) said non-ionic hydrophilic monomer is present at about 30 to about 60 weight percent, (b) said hydrophobic styrene-containing monomer is present at about 2.5 to about 4.5 weight percent, (c) said tris(siloxy)silyl group-containing monomer is present at about 30 to about 65 weight percent, and (d) said fluorinated monomer is present up to about 20 weight percent.

30. The contact lens according to claim 28 wherein said lens exhibits an oxygen permeability of greater than 60 Dk units and a water content at equilibrium hydration of about 40 to about 55 weight percent.

31. A contact lens that is the co-polymerization product of a monomer mixture comprising (a) a non-ionic hydrophilic monomer, (b) a tris(siloxy)silyl group-containing monomer, (c) a hydrophobic aromatic monomer, (d) a single monomer selected from a monomer group consisting of a polyfluorinated monomer, a cationic monomer, a hydrophobic non-aromatic monomer or a mixture of at least two members selected from the monomer group, wherein said single monomer or mixture is present in an amount effective to provide said contact lens with an increased oxygen permeability and an increased water content at equilibrium hydration and (e) a cross-linking agent, the monomer mixture including a weight ratio of tris(siloxy)silyl group-containing monomer to hydrophilic monomer of about 0.3:1 to about 2:1, and a weight ratio of tris(siloxy)silyl group-containing monomer to the single monomer or mixture of (d) of about 1.5:1 to about 20:1, said lens exhibiting an oxygen permeability of about 45 to about 150 Dk units and a water content at equilibrium hydration of about 35 to about 55 weight percent.

32. The contact lens according to claim 31 wherein said non-ionic hydrophilic monomer contains a methacrylamide, an acrylamide, a methacrylate ester or an acrylate ester group.

33. The contact lens according to claim 31 wherein said hydrophobic aromatic monomer is a styrene-containing monomer.

34. The contact lens according to claim 31 wherein said hydrophobic non-aromatic monomer is a $C_1$–$C_{10}$ aliphatic ester of acrylic acid or methacrylic acid.

35. The contact lens according to claim 31 wherein said tris(siloxy)silyl group-containing monomer is a tris(trimethylsiloxy)silyl group-containing amide or ester of acrylic acid or methacrylic acid.

36. The contact lens according to claim 31 wherein said polyfluorinated monomer contains about 3 to about 20 fluorine atoms and 4 to about 20 carbon atoms per monomer molecule and is an amide or ester of acrylic acid or methacrylic acid.

37. A contact lens that is the co-polymerization product of a monomer mixture comprising (a) a non-ionic hydrophilic monomer, (b) a tris(siloxy)silyl group-containing monomer, (c) a hydrophobic aromatic monomer, (d) a cationic monomer or a mixture of said cationic monomer and a polyfluorinated monomer and/or a hydrophobic non-aromatic monomer, wherein said cationic monomer is an ester of acrylic or methacrylic acid, and (e) a cross-linking agent, the monomer mixture including a weight ratio of tris(siloxy)silyl group-containing monomer to hydrophilic monomer of about 0.3:1 to about 2:1, and a weight ratio of tris(siloxy)silyl group-containing monomer to the cationic monomer or mixture of (d) of about 1.5:1 to about 20:1, said lens exhibiting an oxygen permeability of about 45 to about 150 Dk units and a water content at equilibrium hydration of about 35 to about 55 weight percent.

38. A contact lens of claim 36, wherein said non-ionic hydrophilic monomer contains a methacrylamide, an acrylamide, a methacrylate ester or an acrylate ester group, wherein said tris(siloxy)silyl group-containing monomer is an amide or ester of acrylic acid or methacrylic acid, wherein said hydrophobic aromatic monomer is a hydrophobic styrene-containing monomer, wherein said cationic monomer is an ester of acrylic acid or methacrylic acid, wherein said hydrophobic non-aromatic monomer is a $C_1$–$C_{10}$ aliphatic ester of acrylic acid or methacrylic acid, wherein the weight ratio of tris(siloxy)silyl group-containing monomer to hydrophilic monomer is about 0.6:1 to about 2:1, and wherein the weight ratio of tris(siloxy)silyl group-containing monomer to the single monomer or mixture of (d) is about 1.5:1 to about 20:1.

39. A contact lens that is the co-polymerization product of a monomer mixture comprising (a) a non-ionic hydrophilic monomer that contains a methacrylamide, an acrylamide, a methacrylate ester or an acrylate ester group, (b) a tris(siloxy)silyl group-containing monomer that is an amide or ester of acrylic acid or methacrylic acid, (c) a hydrophobic styrene-containing monomer, (d) a polyfluorinated monomer or a mixture of said polyfluorinated monomer with a cationic monomer and/or a hydrophobic non-aromatic monomer, wherein said polyfluorinated monomer contains about 3 to about 20 fluorine atoms and 4 to about 20 carbon atoms per monomer molecule and is a sulfonamido ethyl ester of acrylic acid or methacrylic acid, wherein said cationic monomer is an ester of acrylic acid or methacrylic acid, wherein said hydrophobic non-aromatic monomer is a $C_1$–$C_{10}$ aliphatic ester of acrylic acid or methacrylic acid, and (e) a cross-linking agent, the monomer mixture including a weight ratio of tris(siloxy)silyl group-containing monomer to hydrophilic monomer of about 0.6:1 to about 2:1, and a weight ratio of tris(siloxy)silyl group-containing monomer to the polyfluorinated monomer or mixture of (d) of about 1.5:1 to about 20:1, said lens exhibiting an oxygen permeability of about 45 to about 150 Dk units and a water content at equilibrium hydration of about 35 to about 55 weight percent.

40. The contact lens according to claim 38 wherein the weight ratio of the tris(siloxy)silyl group-containing monomer to the non-ionic hydrophilic monomer is about 0.7:1 to about 1.4:1.

41. The contact lens according to claim 38 wherein said lens has an oxygen permeability of greater than about 60 Dk units.

42. The contact lens according to claim 38 wherein (a) said non-ionic hydrophilic monomer is present at about 30 to about 60 weight percent, (b) said hydrophobic monomer is present at about 2.5 to about 4.5 weight percent, (c) said tris(siloxy)silyl group-containing monomer is present at about 30 to about 65 weight percent, and (d) said polyfluorinated monomer, cationic monomer, hydrophobic non-aromatic monomer or mixture of two or three of those monomer types is present up to about 35 weight percent.

43. A contact lens that is the co-polymerization product of a monomer mixture comprising (a) a non-ionic hydrophilic monomer, (b) a cationic monomer, (c) a tris(siloxy)silyl group-containing monomer, (d) a hydrophobic aromatic monomer and (e) a cross-linking agent, the monomer mixture including a weight ratio of tris(siloxy)silyl group-containing monomer to hydrophilic monomer of about 0.3:1 to about 2:1, said lens exhibiting an oxygen permeability of greater than 45 Ok units and a water content at equilibrium hydration of about 35 to about 55 weight percent.

44. The contact lens according to claim 43 wherein said non-ionic hydrophilic monomer contains a methacrylamide, an acrylamide, a methacrylate ester or an acrylate ester group.

45. The contact lens according to claim 43 wherein said hydrophobic aromatic monomer is a styrene-containing monomer.

46. The contact lens according to claim 43 wherein said tris(siloxy)silyl group-containing monomer is a tris (trimethylsiloxy)silyl group-containing amide or ester of acrylic acid or methacrylic acid.

47. The contact lens according to claim 43 wherein said cationic monomer is an ester of acrylic or methacrylic acid.

48. A contact lens that is the co-polymerization product of a monomer mixture comprising (a) a non-ionic hydrophilic monomer, (b) a cationic monomer that is an ester of acrylic or methacrylic acid, (c) a tris(siloxy)silyl group-containing monomer that is an amide or ester of acrylic acid or methacrylic acid, (d) a hydrophobic styrene-containing monomer and (e) a cross-linking agent, the monomer mixture including a weight ratio of tris(siloxy)silyl group-containing monomer to hydrophiiic monomer of about 0.3:1 to about 2:1, said lens exhibiting an oxygen permeability of greater than 45 Dk units and a water content at equilibrium hydration of about 35 to about 55 weight percent.

49. The contact lens according to claim 48 wherein said monomer mixture further comprises a fluorinated monomer containing about 3 to about 20 fluorine atoms per monomer molecule which is a sulfonamido ethyl ester of acrylic acid or methacrylic acid.

50. The contact lens according to claim 48 wherein the weight ratio of the tris(siloxy)silyl group-containing monomer to the non-ionic hydrophilic monomer is about 0.7:1 to about 1.4:1.

51. The contact lens according to claim 48 wherein (a) said non-ionic hydrophilic monomer is present at about 30 to about 60 weight percent, (b) said hydrophobic styrene-containing monomer is present at about 2.5 to about 4.5 weight percent, (c) said tris(siloxy)silyl group-containing monomer is present at about 30 to about 65 weight percent, and (d) said cationic monomer is present at about 20 to about 25 weight percent.

52. The contact lens according to claim 48 wherein said cationic monomer is 2-N-morpholinoethyl methacrylate.

53. A contact lens that is the co-polymerization product of a monomer mixture comprising (a) a non-ionic hydrophilic monomer, (b) a poly(dimethylsiloxy)silyl group-containing monomer, (c) a tris(siloxy)silyl group-containing monomer, (d) a hydrophobic styrene-containing monomer in an amount effective to provide said contact lens with increased oxygen permeability, and (e) a cross-linking agent, said monomer mixture including a weight ratio of tris(siloxy) silyl group-containing monomer to hydrophilic monomer of about 0.3:1 to about 2:1, and exhibiting a water content on equilibrium hydration of at least 20 weight percent and an oxygen permeability of about 55 to about 150 Dk units.

54. The contact lens according to claim 53 wherein said non-ionic hydrophilic monomer contains a methacrylamide, an acrylamide, a methacrylate ester or an acrylate ester group.

55. The contact lens according to claim 53 wherein said poly(dimethylsiloxy)silyl group-containing monomer is an ester or amide of acrylic acid or methacrylic acid.

56. The contact lens according to claim 53 wherein said tris(siloxy)silyl group-containing monomer is a tris (trimethylsiloxy)silyl group-containing amide or ester of acrylic acid or methacrylic acid.

57. A contact lens of claim 54, wherein said poly (dimethylsiloxy)silyl group-containing monomer is an ester or amide of acrylic acid or methacrylic acid, wherein said tris(siloxy)silyl group-containing monomer is an amide or ester of acrylic acid or methacrylic acid, wherein the weight ratio of tris(siloxy)silyl group-containing monomer to hydrophilic monomer is about 0.6:1 to about 2:1.

58. The contact lens according to claim 57 wherein said poly(dimethylsiloxy)silyl group-containing monomer is an ester or amide of acrylic acid or methacrylic acid includes a poly(dimethylsiloxy) portion and has a molecular weight of about 1000 to about 5000.

59. The contact lens according to claim 57 wherein the weight ratio of the tris(siloxy)silyl group-containing monomer to the non-ionic hydrophilic monomer is about 0.7:1 to about 1.4:1.

60. The contact lens according to claim 57 wherein (a) said non-ionic hydrophilic monomer is present at about 30 to about 60 weight percent, (b) said hydrophobic styrene-containing monomer is present at about 2.5 to about 4.5 weight percent, (c) said tris(siloxy)silyl group-containing monomer is present at about 30 to about 65 weight percent, and (d) said poly(dimethylsiloxy)silyl group-containing monomer is present at about 1 to about 6 weight percent.

61. A contact lens that is the co-polymerization product of a monomer mixture comprising (a) a non-ionic hydrophilic monomer, (b) a poly(dimethylsiloxy)silyl group-containing monomer, (c) a tris(siloxy)silyl group-containing monomer, (d) a single monomer selected from a monomer group consisting of a cationic monomer, a hydrophobic aromatic monomer, a hydrophobic aliphatic monomer, and a polyfluorinated monomer or a mixture of at least two members selected from the monomer group, wherein said single monomer or mixture is present in an amount effective to provide said contact lens with an increased oxygen permeability and an increased water content at equilibrium hydration and (e) a cross-linking agent, said monomer mixture including a weight ratio of tris(siloxy)silyl group-containing monomer to hydrophilic monomer of about 0.3:1 to about 2:1, and exhibiting a water content on equilibrium hydration of at least 20 weight percent and an oxygen permeability of about 55 to about 150 Ok units.

62. The contact lens according to claim 61 wherein said non-ionic hydrophilic monomer contains a methacrylamide, an acrylamide, a methacrylate ester or an acrylate ester group.

63. The contact lens according to claim 61 wherein said poly(dimethylsiloxy)silyl group-containing monomer is an ester or amide of acrylic acid or methacrylic acid.

64. The contact lens according to claim 61 wherein said tris(siloxy)silyl group-containing monomer is a tris(trimethylsiloxy)silyl group-containing amide or ester of acrylic acid or methacrylic acid.

65. The contact lens according to claim 61 wherein said hydrophobic aromatic monomer is a styrene-containing monomer.

66. A contact lens that is the co-polymerization product of a monomer mixture comprising (a) a non-ionic hydrophilic monomer, (b) a poly(dimethylsiloxy)silyl group-containing monomer, (c) a tris(siloxy)silyl group-containing monomer, (d) a cationic monomer or a mixture of said cationic monomer with at least one of a hydrophobic aromatic monomer a hydrophobic aliphatic monomer, and a polyfluorinated monomer, wherein said cationic monomer is an ester of acrylic or methacrylic acid, and (e) a cross-linking agent, said monomer mixture including a weight ratio of tris(siloxy)silyl group-containing monomer to hydrophilic monomer of about 0.3:1 to about 2:1, and exhibiting a water content on equilibrium hydration of at least 20 weight percent and an oxygen permeability of about 55 to about 150 Dk units.

67. The contact lens according to claim 61 wherein said hydrophobic aliphatic monomer is a $C_1$–$C_{10}$ aliphatic ester of acrylic acid or methacrylic acid.

68. The contact lens according to claim 61 wherein said polyfluorinated monomer contains about 3 to about 20 fluorine atoms per monomer molecule and is an amide or ester of acrylic acid or methacrylic acid.

69. A contact lens that is the co-polymerization product of a monomer mixture comprising (a) a non-ionic hydrophilic monomer that contains a methacrylamide, an acrylamide, a methacrylate ester or an acrylate ester group, (b) a poly(dimethylsiloxy)silyl group-containing monomer that is an ester or amide of acrylic acid or methacrylic acid, (c) a tris(siloxy)silyl group-containing monomer that is an ester or amide of acrylic acid or methacrylic acid, (d) a single monomer selected from a monomer group consisting of a cationic monomer that is an ester of acrylic or methacrylic acid, a styrene-containing monomer, a hydrophobic aliphatic monomer that is a $C_1$–$C_{10}$ aliphatic ester of acrylic acid or methacrylic acid, and a polyfluorinated monomer that contains about 3 to about 20 fluorine atoms and 4 to about 20 carbon atoms per monomer molecule and is an amide or ester of acrylic acid or methacrylic acid, or a mixture of at least two members selected from the monomer group, wherein said single monomer or mixture is present in an amount effective to provide said contact lens with an increased oxygen permeability and an increased water content at equilibrium hydration and (e) a cross-linking agent, said monomer mixture including a weight ratio of tris(siloxy)silyl group-containing monomer to hydrophilic monomer of about 0.6:1 to about 2:1, and exhibiting a water content on equilibrium hydration of at least 20 weight percent and an oxygen permeability of about 55 to about 150 Dk units.

70. The contact lens according to claim 69 wherein said poly(dimethylsiloxy)silyl group-containing monomer is an ester or amide of acrylic acid or methacrylic acid that includes a poly(dimethylsiloxy) portion and has a molecular weight of about 1000 to about 5000.

71. The contact lens according to claim 69 wherein the weight ratio of the tris(siloxy)silyl group-containing monomer to the non-ionic hydrophilic monomer is about 0.7:1 to about 1.4:1.

72. The contact lens according to claim 69 wherein (a) said non-ionic hydrophilic monomer is present at about 30 to about 60 weight percent, (b) said poly(dimethylsiloxy)silyl group-containing monomer is present at about 1 to about 6 weight percent, (c) said tris(siloxy)silyl group-containing monomer is present at about 30 to about 65 weight percent, and (d) said single monomer or mixture is present at up to about 35 weight percent.

73. A contact lens that is the co-polymerization product of a monomer mixture comprising (a) a non-ionic hydrophilic monomer, (b) a tris(siloxy)silyl group-containing monomer, (c) a single monomer selected from a monomer group consisting of a polyfluorinated monomer, a cationic monomer, and a hydrophobic non-aromatic monomer, or a mixture of at least two members selected from the monomer group, wherein said single monomer or mixture is present in an amount effective to provide said contact lens with an increased oxygen permeability and an increased water content at equilibrium hydration and (d) a cross-linking agent, the monomer mixture including a weight ratio of tris(siloxy)silyl group-containing monomer to hydrophilic monomer of about 0.3:1 to about 2:1, and a weight ratio of tris(siloxy)silyl group-containing monomer to a single monomer or monomer mixture of (c) of about 1.5:1 to about 20:1, said lens exhibiting an oxygen permeability of about 45 to about 150 Dk units and a water content at equilibrium hydration of about 35 to about 55 weight percent.

74. The contact lens according to claim 73 wherein said non-ionic hydrophilic monomer contains a methacrylamide, an acrylamide, a methacrylate ester or an acrylate ester group.

75. The contact lens according to claim 73 wherein said tris(siloxy)silyl group-containing monomer is a tris(trimethylsiloxy)silyl group-containing amide or ester of acrylic acid or methacrytic acid.

76. The contact lens according to claim 73 wherein said polyfluorinated monomer contains about 3 to about 20 fluorine atoms per monomer molecule and is an amide or ester of acrylic acid or methacrylic acid.

77. A contact lens that is the co-polymerization product of a monomer mixture comprising (a) a non-ionic hydrophilic monomer, (b) a tris(siloxy)silyl group-containing monomer, (c) a cationic monomer or a mixture of said cationic monomer with a polyfluorinated monomer and/or a hydrophobic non-aromatic monomer, wherein said cationic monomer is an ester of acrylic or methacrylic acid, and (d) a cross-linking agent, the monomer mixture including a weight ratio of tris(siloxy)silyl group-containing monomer to the hydrophilic monomer of about 0.3:1 to about 2:1, and a weight ratio of tris(siloxy)silyl group-containing monomer to a single monomer or monomer mixture of (c) of about 1.5:1 to about 20:1, said lens exhibiting an oxygen permeability of about 45 to about 150 Dk units and a water content at equilibrium hydration of about 35 to about 55 weight percent.

78. The contact lens according to claim 73 wherein said hydrophobic non-aromatic monomer is a $C_1$–$C_{10}$ aliphatic ester of acrylic acid or methacrylic acid.

79. A contact lens of claim 76, wherein said non-ionic hydrophilic monomer contains a methacrylamide, an acrylamide, a methacrylate ester or an acrylate ester group, wherein said tris(siloxy)silyl group-containing monomer is an amide or ester of acrylic acid or methacrylic acid, wherein said a cationic monomer that is an ester of acrylic or methacrylic acid, wherein said hydrophobic non-aromatic monomer is a $C_1$–$C_{10}$ aliphatic ester of acrylic acid or methacrylic acid wherein the weight ratio of tris(siloxy)silyl group-containing monomer to hydrophilic monomer is about 0.6:1 to about 2:1.

80. A contact lens that is the co-polymerization product of a monomer mixture comprising (a) a non-ionic hydrophilic monomer that contains a methacrylamide, an acrylamide, a methacrylate ester or an acrylate ester group, (b) a tris (siloxy)silyl group-containing monomer that is an amide or ester of acrylic acid or methacrylic acid, (c) a polyfluorinated monomer or a mixture of said polyfluorinated monomer with a cationic monomer and/or a hydrophobic non-aromatic monomer, wherein said cationic monomer is an ester of acrylic or methacrylic acid, wherein said hydrophobic non-aromatic monomer is a $C_1$–$C_{10}$ aliphatic ester of acrylic acid or methacrylic acid, wherein said polyfluorinated monomer containing about 3 to about 20 fluorine atoms per monomer molecule is a sulfonamido ethyl ester of acrylic acid or methacrylic acid and (d) a cross-linking agent, the monomer mixture including a weight ratio of tris(siloxy)silyl group-containing monomer to the hydrophilic monomer of about 0.6:1 to about 2:1, and a weight ratio of tris(siloxy)silyl group-containing monomer to the polyfluorinated monomer or mixture of (c) of about 1.5:1 to about 20:1, said lens exhibiting an oxygen permeability of about 45 to about 150 Dk units and a water content at equilibrium hydration of about 35 to about 55 weight percent.

81. The contact lens according to claim 79 wherein (a) said non-ionic hydrophilic monomer is present at about 30 to about 60 weight percent, (b) said tris(siloxy)silyl group-containing monomer is present at about 30 to about 65 weight percent, (c) said single monomer or mixture is present at up to about 35 weight percent.

82. A prolonged wear contact lens that comprises a co-polymer of (a) a non-ionic hydrophilic monomer, (b) a tris(siloxy)silyl group-containing monomer, (c) a cationic monomer, (d) at least one monomer selected from the group consisting of a polyfluorinated monomer, a poly-(dimethylsiloxy)silyl monomer, and a hydrophobic monomer and (e) a cross-linking agent, wherein the weight ratio of the tris(siloxy)silyl group-containing monomer to the hydrophilic monomer is about 0.3:1 to about 2:1, said lens exhibiting an oxygen permeability of about 45 to about 150 Dk units, a water content at equilibrium hydration of about 35 to about 55 weight percent, said lens separately binding mucin and lysozyme in vitro at a ratio by weight of about 1:2 to about 2:1 and in an amount of about 0.75 to about 2.5 $\mu g/cm^2$ when said proteins are separately present a initial concentrations of 0.46 g/L in aqueous buffers at a pH value of 7.2–7.6.

83. The contact lens according to claim 82 wherein said non-ionic hydrophilic monomer contains a methacrylamide, an acrylamide, a methacrylate ester or an acrylate ester group.

84. The contact lens according to claim 82 wherein said tris(siloxy)silyl group-containing monomer is a tris (trimethylsiloxy)silyl group-containing amide or ester of acrylic acid or methacrylic acid.

85. The contact lens according to claim 82 wherein said cationic monomer is an ester of acrylic or methacrylic acid.

86. The contact lens according to claim 82 wherein said polyfluorinated monomer contains about 3 to about 20 fluorine atoms and 4 to about 20 carbon atomsper monomer molecule and is an amide or ester of acrylic acid or methacrylic acid.

87. The contact lens according to claim 82 wherein said poly(dimethylsiloxy)silyl group-containing monomer is an ester or amide of acrylic acid or methacrylic acid.

88. The contact lens according to claim 82 wherein said hydrophobic monomer is a styrene-containing monomer.

89. The contact lens according to claim 82 wherein said hydrophobic monomer is a $C_1$–$C_{10}$ aliphatic ester of acrylic acid or methacrylic acid.

90. A prolonged wear contact lens that comprises a co-polymer of (a) a non-ionic hydrophilic monomer that contains a methacrylamide, an acrylamide, a methacrylate ester or an acrylate ester group, (b) a tris(siloxy)silyl group-containing monomer that is an amide or ester of acrylic acid or methacrylic acid, (c) a cationic monomer that is an ester of acrylic or methacrylic acid, (d) at least one monomer selected from the group consisting of a polyfluorinated monomer that contains about 3 to about 20 fluorine atoms and 4 to about 20 carbon atoms per monomer molecule and is an amide or ester of acrylic acid or methacrylic acid, a poly-(dimethylsiloxy)silyl monomer that is an ester or amide of acrylic acid or methacrylic acid, a hydrophobic aromatic monomer that is a styrene-containing monomer, and a hydrophobic aliphatic monomer that is a $C_1$–$C_{10}$ aliphatic ester of acrylic acid or methacrylic acid and (e) a cross-linking agent, wherein the weight ratio of the tris(siloxy) silyl group-containing monomer to the hydrophilic monomer is about 0.6:1 to about 2:1, said lens exhibiting an oxygen permeability of about 45 to about 150 Dk units, a water content at equilibrium hydration of about 35 to about 55 weight percent, said lens separately binding mucin and lysozyme in vitro at a ratio by weight of about 1:2 to about 2:1 and in an amount of about 0.75 to about 2.5 $\mu g/cm^2$ when said proteins are separately present at initial concentrations of 0.46 g/L in aqueous buffers at a pH value of 7.2–7.6.

91. The contact lens according to claim 90 wherein said polyfluorinated monomer containing about 3 to about 20 fluorine atoms per monomer molecule is a sulfonamido ethyl ester of acrylic acid or methacrylic acid.

92. The contact lens according to claim 90 wherein said poly(dimethylsiloxy)silyl group-containing monomer is an ester or amide of acrylic acid or methacrylic acid that includes a poly(dimethylsiloxy) portion and has a molecular weight of about 1000 to about 5000.

93. The contact lens according to claim 90 wherein (a) said non-ionic hydrophilic monomer is present at about 30 to about 60 weight percent, (b) said tris(siloxy)silyl group-containing monomer is present at about 30 to about 65 weight percent, (c) said cationic monomer is present at about 20 to about 25 weight percent, and (d) said at least one monomer selected from the group consisting of the polyfluorinated monomer, the hydrophobic aliphatic monomer, the styrene-containing monomer, and the poly(dimethylsiloxy) silyl group-containing monomer is present at up to about 35 weight percent.

94. A process for preparing an ophthalmic contact lens that comprises the steps of a) thermally co-polymerizing a monomer mixture in a filled and closed casting cup for a time period of about ten to about fifteen minutes at a temperature of about 110 to about 14000, said monomer mixture comprising (a) a hydrophilic monomer that is an unsubstituted, mono- or di-substituted 01–04-alkyl acrylamide or methacrylamide, (b) a tris(siloxy)silyl group-containing monomer, (c) at least one monomer selected from the group consisting of a polyfluorinated monomer, a cationic monomer, a hydrophobic non-aromatic monomer, a hydrophobic aromatic monomer, and a poly(dimethylsiloxy) silyl group-containing monomer and (d) a cross-linking agent, wherein the weight ratio of the tris(siloxy)silyl group-containing monomer to the hydrophilic monomer is about 0.3:1 to about 2:1; and (b) on completion of the polymerization, cooling, opening the casting cups, removing the lenses and hydrating the lenses for use, said lens exhibiting an oxygen permeability of about 45 to about 150 Ok units and a hydrated water content of about 20 to about 55 weight percent upon hydration.

95. The process according to claim 94 wherein said tris(siloxy)silyl group-containing monomer is a tris(trimethylsiloxy)silyl group-containing amide or ester of acrylic acid or methacrylic acid.

96. The process according to claim 94 wherein said polyfluorinated monomer contains about 3 to about 20 fluorine atoms per monomer molecule and is an amide or ester of acrylic acid or methacrylic acid.

97. The process according to claim 94 wherein said cationic monomer is an ester of acrylic or methacrylic acid.

98. The process according to claim 94 wherein said hydrophobic non-aromatic monomer is a $C_1$–$C_{10}$ aliphatic ester of acrylic acid or methacrylic acid.

99. The process according to claim 94 wherein said hydrophobic aromatic monomer is a hydrophobic styrene-containing monomer.

100. The process according to claim 94 wherein said poly(dimethylsiloxy)silyl group-containing monomer is an ester or amide of acrylic acid or methacrylic acid includes a poly(dimethylsiloxy) portion and has a molecular weight of about 1000 to about 5000.

101. The process according to claim 94 wherein said temperature is about 120 to about 135° C.

102. The process according to claim 94 wherein the weight ratio of the tris(siloxy)silyl group-containing monomer to the hydrophilic monomer is about 0.7:1 to about 1.4:1.

103. In a process of forming ophthalmic lenses by co-polymerization of a monomer mixture comprising (a) a non-ionic hydrophilic monomer that is a methacrylamide or acrylamide, (b) a tris(siloxy)silyl group-containing monomer, the improvement that comprises wet casting said lenses from a composition that includes said monomers, a hydrophobic aromatic or aliphatic monomer or a mixture thereof in an amount effective to provide said lenses with an increased oxygen permeability, a $C_4$–$C_{20}$ monomer containing about 3 to about 20 fluorine atoms in an amount effective to provide said lenses with an increased water content at equilibrium hydration, and a non-co-polymerizable solvent that is miscible in the monomer mixture and is readily removable from the co-polymerized lens.

104. The process according to claim 103 wherein said monomer mixture also includes (c) a poly-(dimethylsiloxy)silyl monomer.

105. The process according to claim 103 wherein said solvent is a $C_1$–$C_4$ monohydric alcohol.

* * * * *